United States Patent
Wu et al.

(10) Patent No.: US 9,225,573 B2
(45) Date of Patent: Dec. 29, 2015

(54) OFDM SYSTEM AND METHOD EMPLOYING OFDM SYMBOLS WITH KNOWN OR INFORMATION-CONTAINING PREFIXES

(75) Inventors: Shiquan Wu, Nepean (CA); Wen Tong, Ottawa (CA); Claude Royer, Hull (CA); Peiying Zhu, Kanata (CA)

(73) Assignee: APPLE INC., Cupertino ( * ) Notice: Subject to any disclaimer, the term of this patent is extended or adjusted under 35 U.S.C. 154(b) by 960 days.

(21) Appl. No.: 13/013,309

(22) Filed: Jan. 25, 2011

(65) Prior Publication Data

US 2011/0116360 A1    May 19, 2011

Related U.S. Application Data

(62) Division of application No. 10/662,465, filed on Sep. 16, 2003, now Pat. No. 7,969,857.

(60) Provisional application No. 60/493,004, filed on Aug. 7, 2003.

(51) Int. Cl.
  *H04L 27/26* (2006.01)
  *H04J 11/00* (2006.01)

(52) U.S. Cl.
  CPC .......... *H04L 27/2626* (2013.01); *H04J 11/0023* (2013.01); *H04L 27/2605* (2013.01)

(58) Field of Classification Search
  None
  See application file for complete search history.

(56) References Cited

U.S. PATENT DOCUMENTS

| | | | |
|---|---|---|---|
| 6,614,861 B1 * | 9/2003 | Terry et al. | 375/347 |
| 6,693,920 B2 | 2/2004 | Montojo et al. | |
| 6,799,023 B2 | 9/2004 | Pinola et al. | |
| 6,907,092 B1 | 6/2005 | Yakhnich et al. | |
| 6,928,062 B2 | 8/2005 | Krishnan et al. | |
| 7,298,692 B2 | 11/2007 | Hiramatsu et al. | |
| 7,298,722 B2 | 11/2007 | Sudo | |
| 2002/0041635 A1 | 4/2002 | Ma | |
| 2002/0122381 A1 | 9/2002 | Wu | |
| 2003/0043894 A1 * | 3/2003 | Sestok et al. | 375/219 |
| 2003/0058787 A1 | 3/2003 | Vandenameele-Lepla | |
| 2003/0081538 A1 | 5/2003 | Walton et al. | |
| 2003/0227866 A1 * | 12/2003 | Yamaguchi | 370/208 |
| 2004/0081131 A1 | 4/2004 | Walton et al. | |
| 2004/0085892 A1 | 5/2004 | Walton et al. | |
| 2004/0181569 A1 * | 9/2004 | Attar et al. | 709/200 |
| 2004/0218522 A1 * | 11/2004 | Sundstrom et al. | 370/208 |

(Continued)

FOREIGN PATENT DOCUMENTS

| | | |
|---|---|---|
| CA | 2354196 | 1/2003 |
| WO | 0209297 | 1/2002 |
| WO | 02093962 | 11/2002 |

OTHER PUBLICATIONS

Lawrey, Eric, OFDM as a modulation technique for wireless communications with a CDMA comparision, 2001, section 1.3.10.

(Continued)

*Primary Examiner* — Mohammad Adhami

(74) *Attorney, Agent, or Firm* — Fay Kaplun & Marcin, LLP

(57) ABSTRACT

Systems and methods for transmitting and receiving OFDM symbols are provided which enable the otherwise wasted transmission time normally used as a prefix for each OFDM symbol to contain useful information. At the receiver, the received signal is processed to convert received OFDM symbols from a linear convolution with the channel to a cyclic convolution.

15 Claims, 21 Drawing Sheets

(56) References Cited

U.S. PATENT DOCUMENTS

2004/0228267 A1* 11/2004 Agrawal et al. .............. 370/203
2004/0252630 A1   12/2004 Alapuranen
2005/0100120 A1*  5/2005 Barton et al. ................ 375/347
2007/0253496 A1* 11/2007 Giannakis et al. ........... 375/260

OTHER PUBLICATIONS

Witschnig, H. et al. "A Different Look on Cyclic Prefix for SC/FDE". The 13th IEEE International Symposium on Personal, Indoor and Mobile Radio Communications, PIMRC 2002, Pavilhao Altantico, Lisboa, Portugal, Sep. 15-18, 2002, pp. 824-828.

Deneire, L et al. "Traning Sequence vs. Cyclic Prefix a New Look on Single Carrier Communication" Global Telecommunications Conference, 2000. Globecom '00. IEEE, vol. 2, Nov. 27-Dec. 1, 2000, pp. 1056-1060.

Benvenuto, N. et al. "On the Comparison Between OFDM and Single Carrier Modulation with a DFE Using a Frequency-Domain Feedforward Filter". IEEE Transactions on Communications, vol. 50, issue 6, Jun. 2002, pp. 947-955.

Bi, Q. et al. "Performance of 1xEV-DO Third-Generation Wireless High-Speed Data Systems", Bell Labs Technical Journal, vol. 7, issue 3, Wiley Periodicals, Inc., Mar. 2003, pp. 97-107.

Muquet, Bertrand; Wang, Zhengda O; Giannakis, Georgios B.; deCourville, Marc; Duhamel, Pierre; "Cyclic Prefixing or Zero Padding for Wireless Multicarrier Transmissions?" IEEE Transactions of Communications, vol. 50, No. 12, Dec. 2002; pp. 2136-2148.

DesBrisay, Greg; Cisco Systems, Inc. Basics of Orthrogonal Frequency Division Multiplexing (OFDM); 2000.

U.S. Appl. No. 13/111,415, filed May 19, 2011.

* cited by examiner

OFDM SYSTEM AND METHOD EMPLOYING OFDM SYMBOLS WITH KNOWN OR INFORMATION-CONTAINING PREFIXES

RELATED APPLICATIONS

This application is a divisional of U.S. application Ser. No. 10/662,465 filed Sep. 16, 2003, which claims the benefit of U.S. Provisional Application No. 60/493,004 filed on Aug. 7, 2003, both of which are hereby incorporated by reference in their entirety.

FIELD OF THE INVENTION

The invention relates to OFDM (orthogonal frequency division multiplexing) system, and in particular to such OFDM systems in which conventionally a prefix has been used with every symbol in order to deal with inter-symbol interference.

BACKGROUND OF THE INVENTION

In OFDM systems, blocks of data are converted from the frequency domain to the time domain using an inverse fast Fourier transform function (IFFT). Effectively, one data element is carried on each of one of a large number of sub-carriers which are closely but orthogonally spaced.

An example of this is shown in FIG. 1 where three OFDM symbols are indicated at 10,12,14. Symbol 10 is referred to as $IFFT_{k-1}$, symbol 12 is $IFFT_k$ and symbol 14 is $IFFT_{k+1}$. These OFDM symbols 10,12,14 constitute the transmitter output 15. These are transmitted over the wireless channel which in the illustrated example is shown to have a channel impulse response 16 or, equivalently a sampled channel response 20. The effect of transmitting over this channel is that the transmitter output 15 is linearly convoluted with the multi-path channel. This is indicated symbolically at 18. Then, at a receiver, three OFDM symbols 22,24,26 are received. These will again contain the $IFFT_{k-1}$, $IFFT_k$, and $IFFT_{k+1}$ respectively. However, due to the multi-path channel $IFFT_{k-1}$ will result in inter-symbol interference in $IFFT_k$. More specifically, the OFDM $ISI_{k-1}$ 28 is the inter-symbol interference which is caused by $IFFT_{k-1}$ in $IFFT_k$, and similarly OFDM $ISI_k$ 30 is the inter-symbol interference caused by $IFFT_k$ 24 in $IFFT_{k+1}$ 26. This inter-symbol interference makes the first part of each OFDM symbol effectively useless for transmitting information. Various approaches have been employed to combat this problem. FIG. 2 shows a first known approach. With this approach, a guard interval is left between each pair of consecutive OFDM symbols, and a prefix for each OFDM symbol is formed by copying a part of the data (the so called Identical Cyclic Prefix), typically from the end of the OFDM symbol. In the example of FIG. 2, shown are three OFDM symbols 40,42,44 represented by $IFFT_{k-1}$, $IFFT_k$ and $IFFT_{k+1}$. The latter part of $IFFT_k$ is shown copied into the prefix 46 and the latter part of $IFFT_{k+1}$ 44 is copied into a second prefix 48. Now, the ISI due to preceding symbols will only interfere with the prefix, and the actual OFDM symbol will be left undistorted. This can be seen in the figure where OFDM $ISI_{k-1}$ 50 is shown to overlap with the prefix 46 upon reception, and OFDM $ISI_k$ 52 is shown to overlap with prefix 48 upon reception. An important side benefit of this approach is that by copying the end part of each IFFT to the prefix, the convolution which occurs between the transmitter output and the multi-path channel becomes mathematically a cyclic convolution rather than a standard linear convolution after the removal of the corresponding prefix part in the receiver end.

A cyclic convolution has some important advantages when it comes to performing channel estimation and compensation and multipath cancellation. The disadvantage of this Identical cyclic Prefix method is the power and bandwidth used by this prefix is a pure overload.

FIG. 3 shows a second known approach to dealing with the problem. In this case, rather than transmitting a prefix containing a copy of part of the IFFT, a prefix which is simply all zeros is transmitted. This is illustrated in the example which shows three OFDM symbols 60,62,64 and a zero padded prefix before OFDM symbols 62 and 64. At the receiver, the OFDM $ISI_{k-1}$ 66 due to $OFDM_{k-1}$ 60 will occur in the zero-padded prefix of OFDM symbol 62. Similarly, the OFDM $ISI_k$ 68 due to OFDM symbol 62 will occur during the zero-padded prefix for symbol $OFDM_{k+1}$ 64. An advantage of this method is that the power wasted in the previous method is saved. However, the bandwidth occupied by those zeros is still a pure overload.

SUMMARY OF THE INVENTION

According to one broad aspect, the invention provides a method comprising: transmitting a first signal comprising OFDM transmission units, each OFDM transmission unit comprising an OFDM symbol, and before/and/or/after the OFDM symbol a respective non-OFDM segment(s) containing known data and/or unknown highly reliable data, the non-OFDM segment allowing a conversion at a receiver between a linear convolution and a cyclic convolution for the OFDM symbol.

In some embodiments, the non-OFDM segment of each OFDM symbol is at least long enough to cover any significant ISI introduced by a previous OFDM symbol.

In some embodiments, the non-OFDM segment comprises a code separated pilot channel, signalling channel, and traffic channel.

In some embodiments, the non-OFDM segment contains multiple channels which are time division multiplexed.

In some embodiments, the multiple channels comprise a pilot channel time segment, signalling and traffic channel time segment during which the signalling and traffic channels are code separated, and another pilot channel segment in sequence.

In some embodiments, the multiple channels comprise a traffic channel time segment, a pilot channel time segment and a signalling channel time segment in sequence.

In some embodiments, the method further comprises: generating the OFDM symbols using fixed duration with varying IFFT size.

In some embodiments, the method further comprises: generating the non-OFDM segments to have fixed durations with varying numbers of samples.

In some embodiments, the first signal further comprises a guard time on either side of each prefix.

In some embodiments, OFDM transmission units are embodied in slots which are 2048 chips in duration, and each slot comprising a first OFDM symbol which is 400 chips in duration followed by a 224 chip duration non-OFDM segment, followed by a second OFDM symbol and third OFDM symbol each of which are 400 chips in duration, followed by a 224 chip duration non-OFDM segment followed by a fourth OFDM symbol which is 400 chips in duration.

In some embodiments, each non-OFDM segment comprises a 64 chip MAC segment, a 96 chip pilot segment and a 64 chip MAC segment in sequence.

In some embodiments, the non-OFDM segments are fully compliant with 1×EV/DO forward link structure, and the first signal has a slot timing which is fully compliant with 1×EV/DO forward link structure.

In some embodiments, each OFDM symbol is a 400 sub-carrier IFFT.

In some embodiments, each OFDM symbol is a 208 sub-carrier IFFT.

In some embodiments, said first signal is transmitted from a first antenna, the method further comprising transmitting a second signal from a second antenna the second signal comprising OFDM transmission units each OFDM transmission unit comprising a respective OFDM symbol and before/and/or/after each OFDM symbol a respective non-OFDM segment containing known data and/or unknown highly reliable data, the non-OFDM segment allowing a conversion at a receiver between a linear convolution and a cyclic convolution.

In some embodiments, each signal comprises slots which are 2048 chips in duration, and each slot comprising a first OFDM symbol which is 400 chips in duration followed by a 224 chip duration non-OFDM segment, followed by a second OFDM symbol and third OFDM symbol each of which are 400 chips in duration, followed by a 224 chip duration non-OFDM segment followed by a fourth OFDM symbol which is 400 chips in duration, the OFDM transmission units being embodied in the slots.

In some embodiments, each non-OFDM segment comprises a 64 chip MAC segment, a 96 chip antenna specific pilot segment and a 64 chip MAC segment in sequence.

In some embodiments, the non-OFDM segments are fully compliant with 1×EV/DO forward link structure, and the first signal has a slot timing which is fully compliant with 1×EV/DO forward link structure.

In some embodiments, the method further comprises: transmitting as part of said first signal CDMA transmission units, each CDMA transmission unit comprising a CDMA data segment and containing before/and/or/after each CDMA data segment a respective non-OFDM segment containing known non-zero data and/or unknown highly reliable data; wherein the signal contains a sequence of transmission units some of which are scheduled to be OFDM transmission units and some of which are scheduled to be CDMA transmission units.

In some embodiments, the non-OFDM segments and CDMA data segments are fully backward compatible with existing IS-856 specifications.

In some embodiments, the first signal comprises slots which are 2048 chips in duration, and each slot comprising a first data segment which is 400 chips in duration followed by a 224 chip duration non-OFDM segment, followed by a second data segment and third data segment each of which are 400 chips in duration, followed by a 224 chip duration non-OFDM segment followed by a fourth data segment which is 400 chips in duration wherein each of the data segments is scheduled to be either a CDMA data segment or an OFDM data segment, the sequence of transmission units being embodied in the slots.

In some embodiments, each non-OFDM segment comprises a 64 chip MAC segment, a 96 chip pilot segment and a 64 chip MAC segment in sequence.

In some embodiments, the method further comprises: transmitting data content of multiple users on the OFDM symbols.

In some embodiments, for each user having data content on a given OFDM symbol a respective band of sub-carriers is used, the respective band comprising a subset of an overall OFDM sub-carrier set.

In some embodiments, the method further comprises: for each user, performing frequency hopping of the respective band of sub-carriers.

In some embodiments, the method further comprises: during the non-OFDM segments transmitting for each user a respective user specific pilot channel, the user specific pilot channels are overlapping in time but are orthogonal to each other.

In some embodiments, the first signal comprises slots which are 2048 chips in duration, and each slot comprising a first OFDM symbol which is 400 chips in duration followed by a 224 chip duration non-OFDM segment, followed by a second OFDM symbol and third OFDM symbol each of which are 400 chips in duration, followed by a 224 chip duration non-OFDM segment followed by a fourth OFDM symbol which is 400 chips in duration, the OFDM transmission units being embodied in the slots.

In some embodiments, each non-OFDM symbol comprises a 64 chip signalling segment, a respective 96 chip pilot segment for each user, and a 64 chip signalling segment in sequence, the pilot segments being overlaid in time and being orthogonal to each other.

In some embodiments, the signal comprises an alternating sequence of CDMA transmission units and OFDM transmission units, the method further comprising performing power control over the CDMA transmission units.

In some embodiments, the OFDM transmission units are embodied in a sequence comprising: 3 tail bits; a 58 point IDFT as an OFDM symbol; 26 bit training sequence; a second 58 point IDFT as another OFDM symbol; 3 tail bits; an 8.25 bit duration guard period wherein the tail bits and or the training sequence function as the non-OFDM segment.

In some embodiments, the method further comprises: transmitting as part of said signal GSM transmission units, wherein the signal contains a sequence of transmission units some of which are scheduled to be OFDM transmission units and some of which are scheduled to be CDMA transmission units; wherein the transmission units are embodied in a sequence comprising: 3 tail bits; a 58 point IDFT as an OFDM symbol for an OFDM transmission unit, or 57 bits of data and a one bit stealing flag for a GSM transmission unit; 26 bit training sequence; a second 58 point IDFT as another OFDM symbol for an OFDM transmission unit or 57 bits of data and a one bit stealing flag for a GSM transmission unit; 3 tail bits; an 8.25 bit duration guard period wherein the tail bits and or the training sequence function as non-OFDM segment.

In some embodiments, the first signal comprises 15 slot frames, the first signal comprising a primary SCH, secondary SCH, pilot channel, and dedicated channel overlaid together as a CDMA signal, the CDMA signal being overlaid in time with said OFDM symbols.

In some embodiments, portions of said CDMA signals function as said non-OFDM segments.

In some embodiments, during each slot, the first signal comprises two OFDM transmission units, each OFDM transmission unit comprising a 128 chip prefix, a 1024 point IFFT, and a 128 chip suffix.

In some embodiments, each 28 chip prefix contains a designed training sequence, and each 128 chip suffix contains system information, broadcast information or short messaging information.

In some embodiments, during each slot, the first signal comprises one OFDM transmission unit, each OFDM transmission unit comprising a 128 chip prefix, a 2024 point IFFT, and a 128 chip suffix.

In some embodiments, the method is for use with a UMTS downlink modified to include an OFDM overlay.

In some embodiments, the method adapts for use with IEEE-802.11 a/g system with a variable non-OFDM segment and/or blind non-OFDM segment detection.

In some embodiments, the method adapts for use with IEEE 802.16a systems.

According to another broad aspect, the invention provides a method of processing a received signal containing a signal containing OFDM transmission units, each OFDM transmission unit containing an OFDM symbol and also containing before/and/or/after each OFDM symbol a respective prefix containing known non-zero data and/or unknown highly reliable data after having been transmitted over a multi-path channel, the method comprising: converting received samples of each OFDM symbol to a respective new set of received samples such that the new set of received samples is mathematically equal to the transmitted samples cyclically convoluted with the channel response of the multi-path channel such that the frequency domain convolution theorem holds true.

In some embodiments, the method further comprises: performing finger searching and channel estimation based on the non-OFDM segments to generate for each non-OFDM segment a respective time domain channel estimate; performing an FFT function on each time domain channel estimate to generate a respective frequency domain channel estimate; performing time frequency interpolation upon multiple frequency domain channel estimates to generate a current frequency domain channel estimate.

In some embodiments, the method further comprises: performing an IFFT on the frequency domain channel estimate to get another time domain channel estimate; using the time domain channel estimate to perform finger searching and channel estimating in the time domain to get a new improved time domain channel estimate; performing the FFT and time frequency interpolation steps again on the improved time domain channel estimate to get an improved current frequency domain channel estimate.

In some embodiments, the method further comprises: demodulating contents of the non-OFDM segment using the time domain channel estimate.

In some embodiments, the method further comprises: demodulating contents of the non-OFDM segment using the improved time domain channel estimate.

In some embodiments, the method further comprises: performing demodulation of a current OFDM symbol using the frequency domain channel estimate.

In some embodiments, the method further comprises: performing demodulation of a current OFDM symbol using the improved frequency domain channel estimate.

In some embodiments, the method further comprises performing channel estimation to recover a discretized time domain channel estimate by: for a first non-OFDM segment containing J known or highly reliable samples, followed by an OFDM symbol, followed by a second non-OFDM segment containing J (or another number) known or highly reliable samples, defining a plurality of equations relating received samples during the first and second non-OFDM segments to corresponding known/highly reliable values as a function of L samples of a discretized channel response, and solving the equations for the L samples of the discretized channel response, where there are at least L equations.

In some embodiments, the method further comprises performing an FFT on the discretized channel response to generate a frequency domain channel response.

In some embodiments, the method further comprises: demodulating contents of the non-OFDM segments using the time domain channel estimate.

In some embodiments, the method further comprises: demodulating contents of the prefix using the improved time domain channel estimate.

In some embodiments, the method further comprises: determining a frequency domain channel estimate; dividing the new set of received samples by the frequency domain channel estimate on a per-sub-carrier basis.

In some embodiments, converting received samples of each OFDM symbol to a respective new set of received samples such that the new set of received samples is mathematically equal to the transmitted samples cyclically convoluted with the channel response of the multi-path channel such that the frequency domain convolution theorem holds true comprises: defining $(L-1) \times (L-1)$ upper and lower matrices U and W, respectively, as $$U = \begin{bmatrix} h(L-1) & h(L-2) & \ldots & h(1) \\ 0 & h(L-1) & \ldots & h(2) \\ \ldots & \ldots & \ldots & \ldots \\ 0 & 0 & \ldots & h(L-1) \end{bmatrix},$$

$$W = \begin{bmatrix} h(0) & 0 & \ldots & 0 \\ h(1) & h(0) & \ldots & 0 \\ \ldots & \ldots & \ldots & \ldots \\ h(L-2) & h(L-3) & \ldots & h(0) \end{bmatrix}$$

and defining the new set of samples $y(0), y(1), \ldots, y(L-2)$ as $$\begin{bmatrix} y(0) \\ y(1) \\ \vdots \\ y(L-2) \end{bmatrix} = \begin{bmatrix} y(0) \\ y(1) \\ \vdots \\ y(L-2) \end{bmatrix} - U \begin{bmatrix} a(1) \\ a(2) \\ \vdots \\ a(L-1) \end{bmatrix} + \begin{bmatrix} z(0) \\ z(1) \\ \vdots \\ z(L-2) \end{bmatrix} - W \begin{bmatrix} b(0) \\ b(1) \\ \vdots \\ b(L-2) \end{bmatrix}$$

where $h(.)$ is a discretized channel response, $a(.)$ are known or highly reliable values for a non-OFDM period preceding the OFDM symbol, $b(.)$ are known or highly reliable values for a non-OFDM period following the OFDM symbol, $z(.)$ are received values for the non-OFDM period following the OFDM symbol, $y(.)$ on the right hand side of the equation are received samples of the OFDM symbol, and $y(.)$ on the left hand side of the equation are the new set of received samples.

According to another broad aspect, the invention provides a method of converting a linear convolution to a cyclic convolution for a received OFDM symbol comprising: defining $(L-1) \times (L-1)$ upper and lower matrices U and W, respectively, as $$U = \begin{bmatrix} h(L-1) & h(L-2) & \ldots & h(1) \\ 0 & h(L-1) & \ldots & h(2) \\ \ldots & \ldots & \ldots & \ldots \\ 0 & 0 & \ldots & h(L-1) \end{bmatrix},$$

-continued $$W = \begin{bmatrix} h(0) & 0 & \ldots & 0 \\ h(1) & h(0) & \ldots & 0 \\ \ldots & \ldots & \ldots & \ldots \\ h(L-2) & h(L-3) & \ldots & h(0) \end{bmatrix}$$

and defining the new set of samples $y(0), y(1), \ldots, y(L-2)$ as $$\begin{bmatrix} y(0) \\ y(1) \\ \vdots \\ y(L-2) \end{bmatrix} = \begin{bmatrix} y(0) \\ y(1) \\ \vdots \\ y(L-2) \end{bmatrix} - U \begin{bmatrix} a(1) \\ a(2) \\ \vdots \\ a(L-1) \end{bmatrix} + \begin{bmatrix} z(0) \\ z(1) \\ \vdots \\ z(L-2) \end{bmatrix} - W \begin{bmatrix} b(0) \\ b(1) \\ \vdots \\ b(L-2) \end{bmatrix}$$

where $h(.)$ is a discretized channel response, $a(.)$ are known or highly reliable values for a non-OFDM period preceding the OFDM symbol, $b(.)$ are known or highly reliable values for a non-OFDM period following the OFDM symbol, $z(.)$ are received values for the non-OFDM period following the OFDM symbol, $y(.)$ on the right hand side of the equation are received samples of the OFDM symbol, and $y(.)$ on the left hand side of the equation are the new set of received samples.

According to another broad aspect, the invention provides a transmitter comprising: a first transmit antenna; OFDM signal generating circuitry for generating OFDM symbols for transmission; non-OFDM signal generating circuitry for generating non-OFDM segments; wherein the OFDM signal generating circuitry and the non-OFDM signal generating circuitry are adapted to generate and transmit through the first transmit antenna a first signal comprising OFDM transmission units, each OFDM transmission unit comprising an OFDM symbol, and before/and/or/after the OFDM symbol a respective non-OFDM segment(s) containing known data and/or unknown highly reliable data, the non-OFDM segment allowing a conversion at a receiver between a linear convolution and a cyclic convolution for the OFDM symbol.

In some embodiments, the non-OFDM segment of each OFDM symbol is at least long enough to cover any significant ISI introduced by a previous OFDM symbol.

In some embodiments, the non-OFDM signal generation circuitry comprises 1×EV/DO signal generation circuitry.

In some embodiments, the transmitter further comprises: a second transmit antenna; wherein the OFDM signal generation circuitry and the non-OFDM signal generation circuitry are further adapted to generate and transmit through the second antenna a second signal comprising OFDM transmission units each OFDM transmission unit comprising a respective OFDM symbol and before/and/or/after each OFDM symbol a respective non-OFDM segment containing known data and/or unknown highly reliable data, the non-OFDM segment allowing a conversion at a receiver between a linear convolution and a cyclic convolution.

In some embodiments, the non-OFDM signal generating circuitry is compatible with IS-856 specifications.

In some embodiments, the non-OFDM signal generating circuitry is compatible with GSM specifications.

BRIEF DESCRIPTION OF THE DRAWINGS

Preferred embodiments of the invention will now be described with reference to the attached drawings in which.

Figure 15:
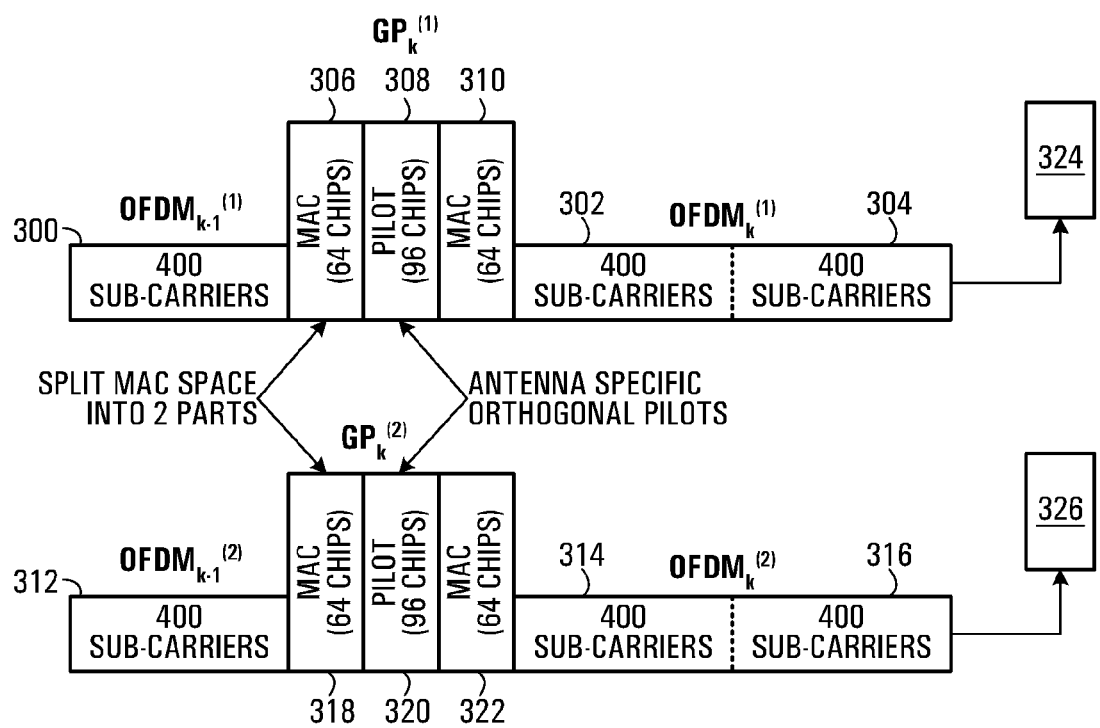
Figure 16:
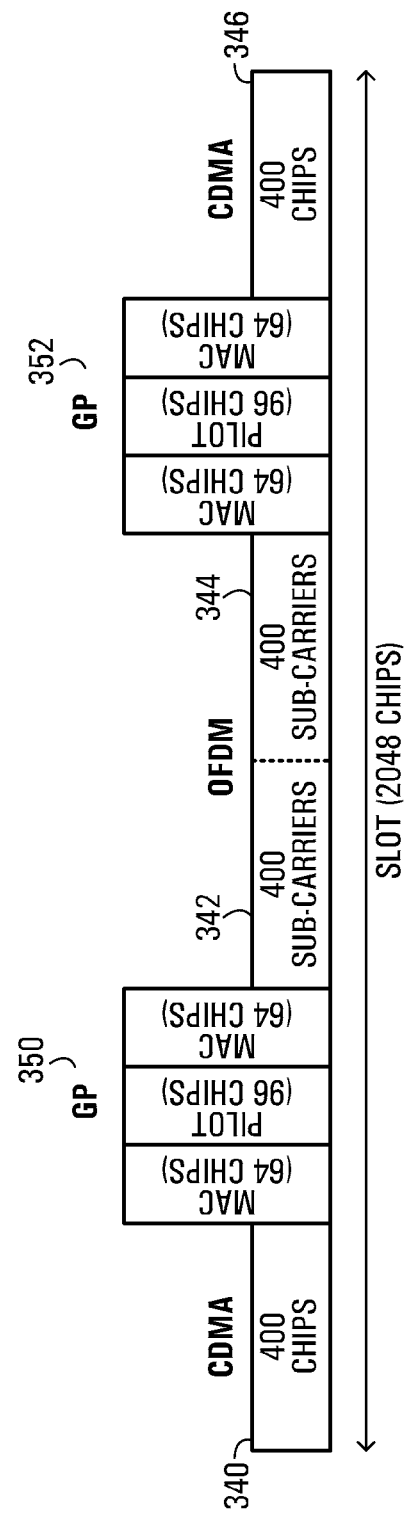
Figure 17:
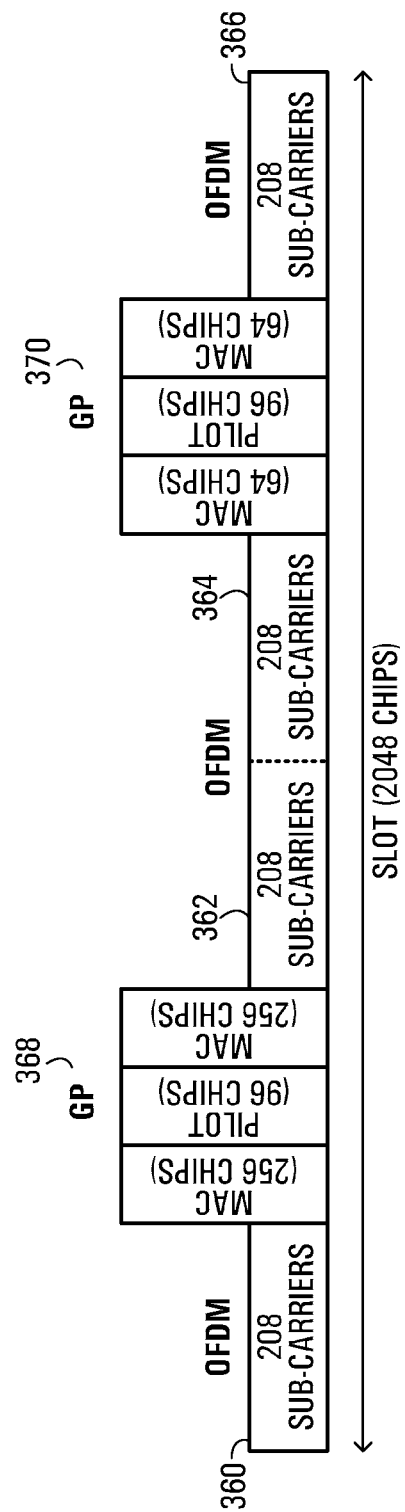
Figure 18:
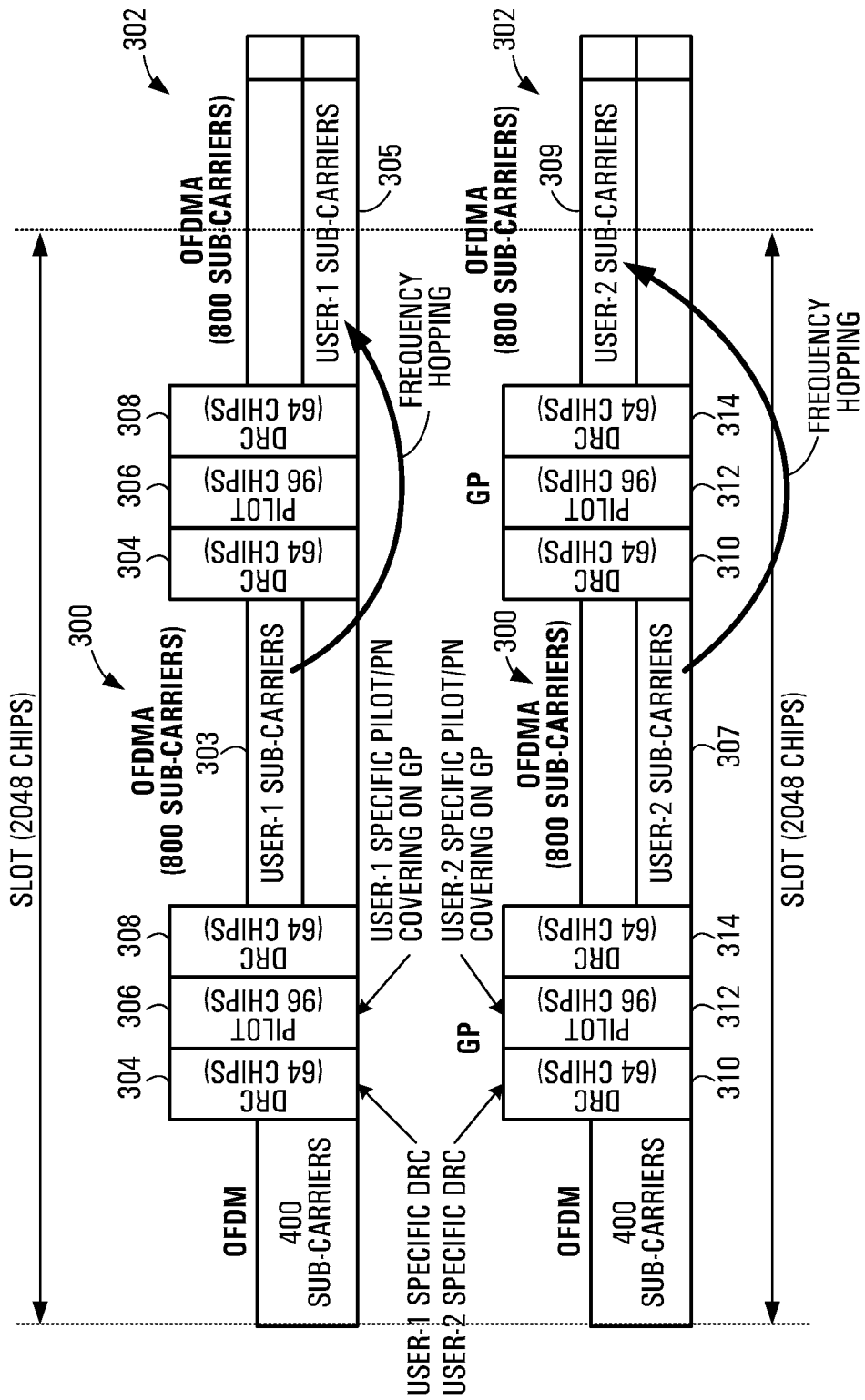
Figure 19:
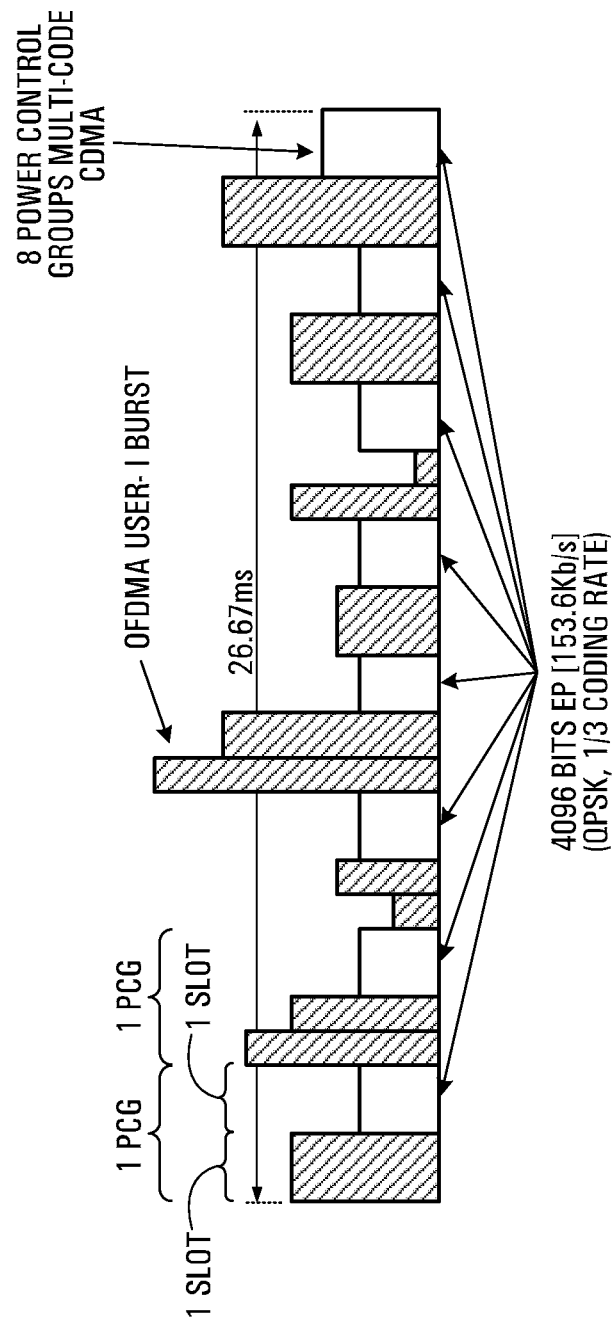
Figure 20:
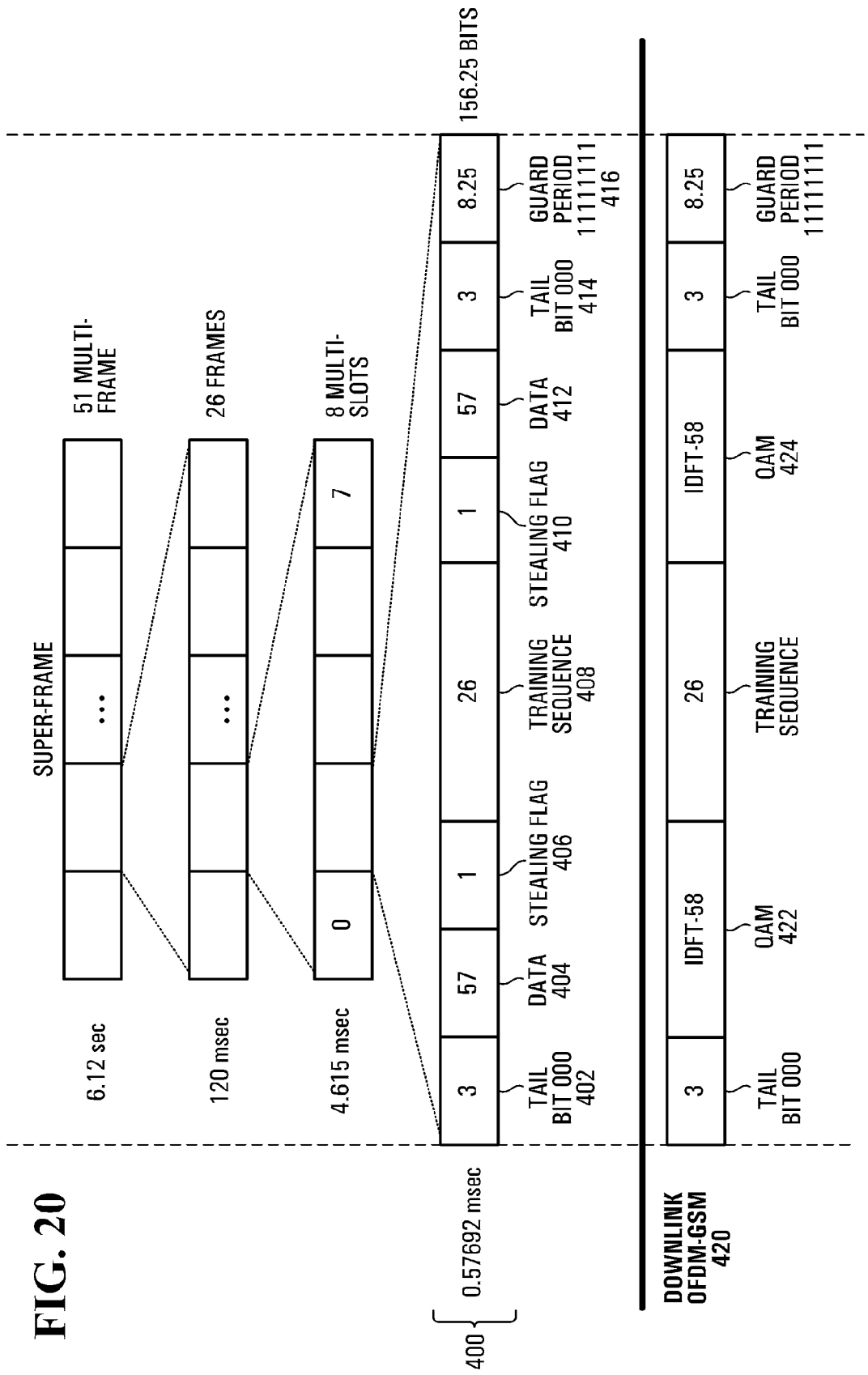
Figure 21:
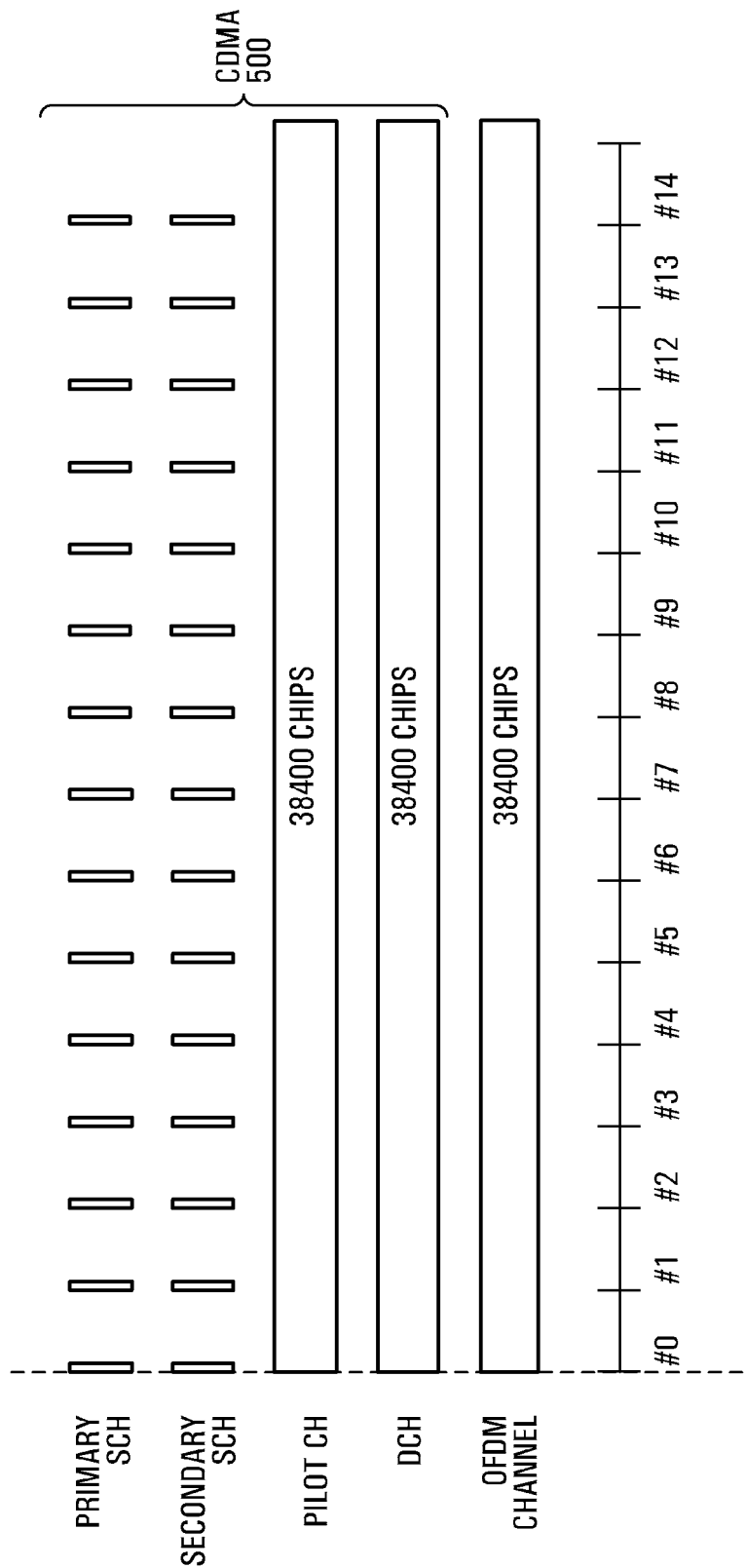
Figure 22:
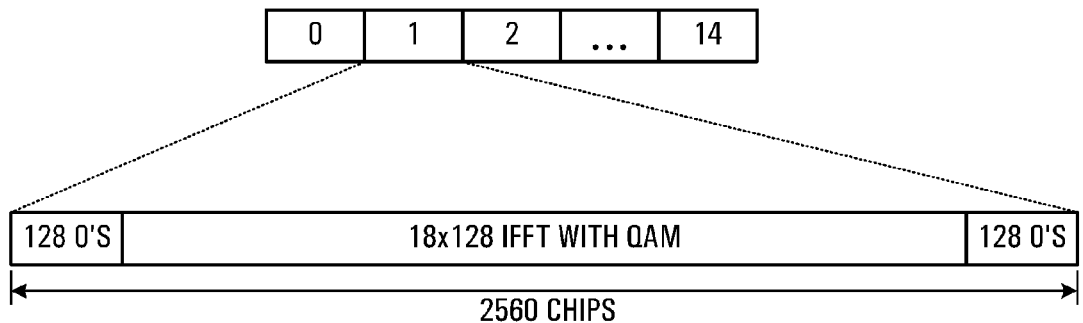
Figure 23:
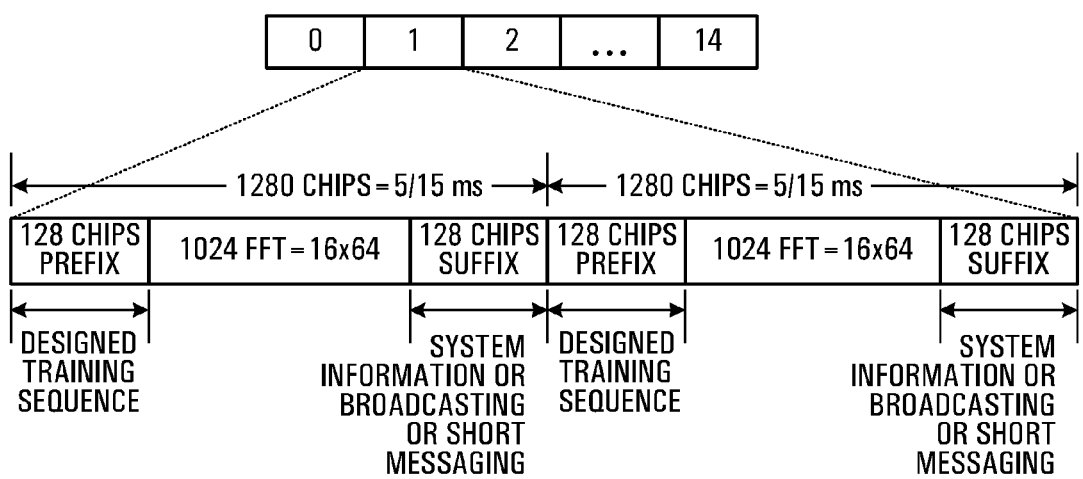
Figure 24:
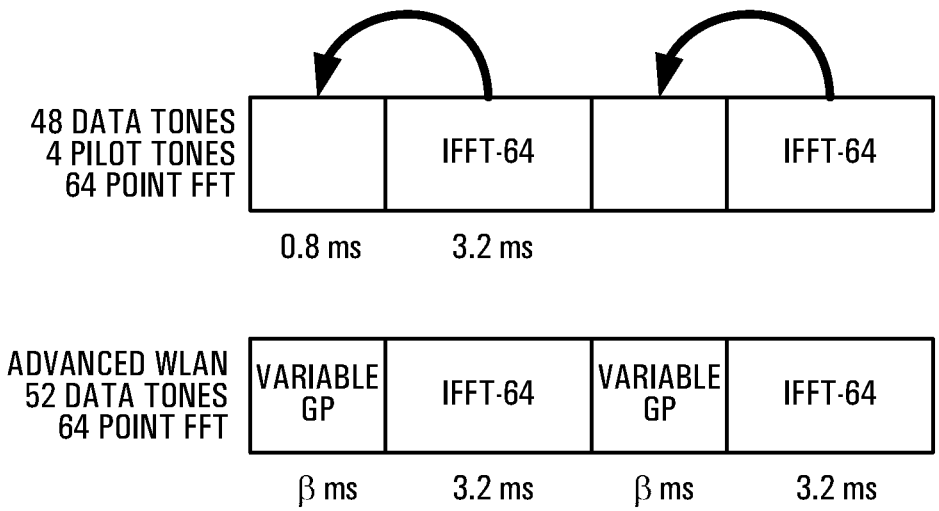
Figure 25:
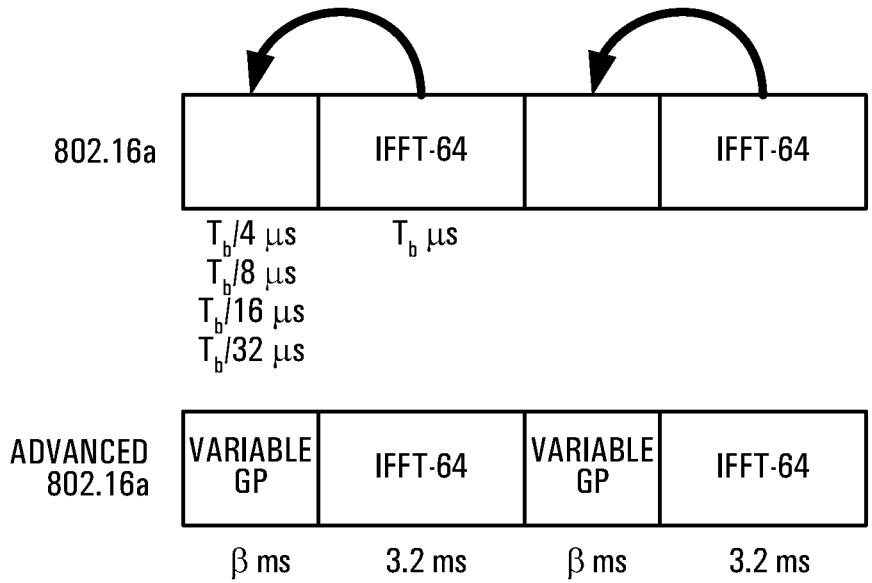

In a second system embodiment shown in FIG. 15, the 1×EV/DO forward link is extended to a MIMO application;

In a third system embodiment shown in FIG. 16, the generalized prefix is applied in the context of a 1×EV/DO forward link with scheduling and backwards compatibility to existing IS-856 specifications;

FIG. 17 shows a fourth system embodiment featuring a variable spreading factor CDMA and OFDM multiplexing;

FIG. 18 is a fifth system embodiment in which the generalized prefix is applied to the 1×EV/DO reverse link;

FIG. 19 is another system embodiment which is backwards compatible with the existing IS-856 power controlled CDMA specification;

A seventh system embodiment is shown in FIG. 20. This shows a GSM/GPRS/EDGE downlink overlay;

FIG. 21 shows an eighth system embodiment in which the UMTS downlink is modified to include an OFDM overlay;

FIGS. 22 and 23 show further details of the embodiment of FIG. 21;

A ninth system embodiment is shown in FIG. 24 which shows an IEEE-802.11 a/g system with a variable GP and/or blind GP detection; and FIG. 25 shows a tenth system embodiment applicable to IEEE 802.16a systems.

DETAILED DESCRIPTION OF THE PREFERRED EMBODIMENTS

Figure 1:
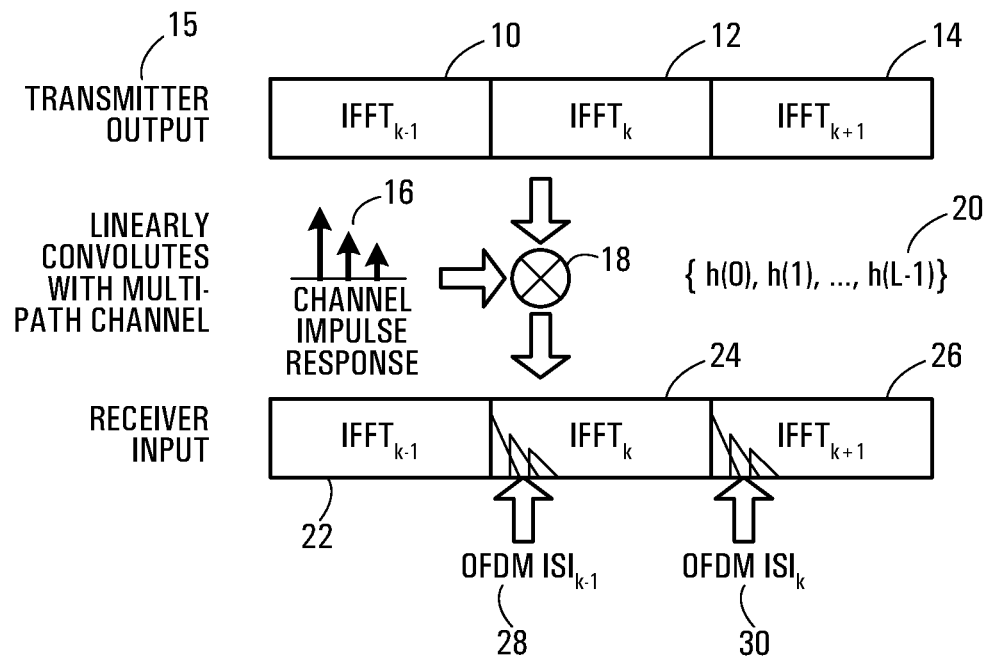
FIG. 1 is a signal diagram showing how consecutive IFFT blocks result in inter-symbol interference.
Figure 2:
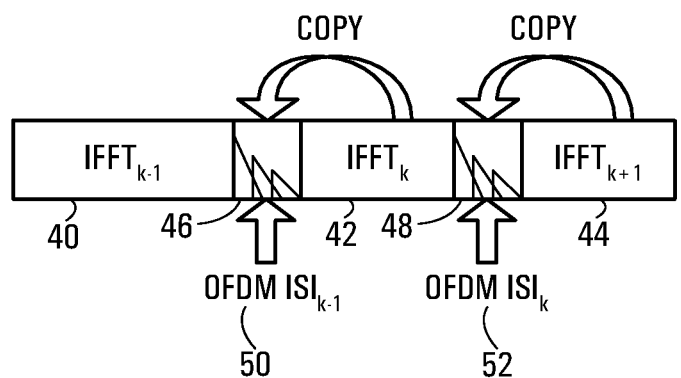
FIG. 2 is a conceptual view of one known approach in dealing with OFDM ISI problem in which a portion of each IFFT block is copied into a prefix.
Figure 3:
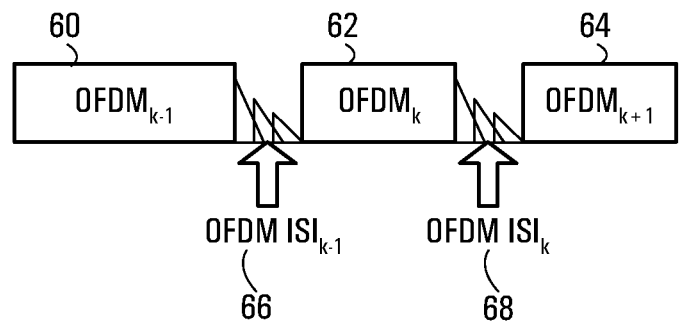
FIG. 3 is a conceptual view of another conventional approach to dealing with the ISI problem in which a zero-padding prefix is employed.
Figure 4:
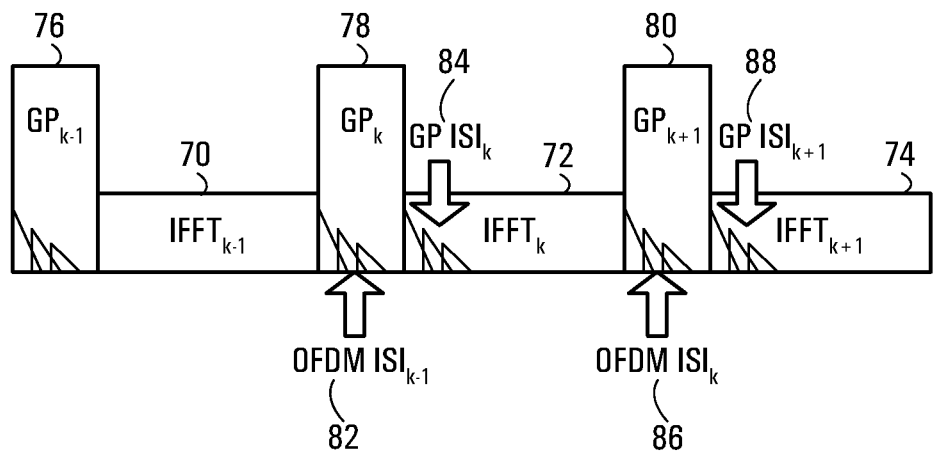
FIG. 4 is a conceptual view of an embodiment of the invention in which a generalized prefix is employed in advance of each IFFT block.

Referring now to FIG. 4, shown is a preferred embodiment of the invention in which during the prefix period inserted between OFDM symbols, a new Generalized Prefix (GP) is transmitted. Thus, in the illustrated example, shown are $IFFT_{k-1}$ 70, $IFFT_k$ 72 and $IFFT_{k+1}$ 74 each having a respective generalized prefix $GP_{k-1}$ 76, $GP_k$ 78 and $GP_{k+1}$ 80. $IFFT_{k-1}$ 70 results in inter-symbol interference $OFDM\ ISI_{k-1}$ 82 in $GP_k$ 78. $GP_k$ 78 results in GP $ISI_k$ 84 in $IFFT_k$ 72. $IFFT_k$ 72 results in OFDM $ISI_k$ 86 in $GP_{k+1}$ 80. Finally, in the illustrated example $GP_{k+1}$ 80 results in GP $ISI_{k+1}$ 88 in $IFFT_{k+1}$ 74. However, as described below the effect of GP ISI on the various IFFT blocks can be removed.

The generalized prefix and the IFFT periods are independent. In general, the generalized prefix for one IFFT period does not need to be identical to that of another IFFT period. In one embodiment, $GP_k$ is a priori known both at the transmitter and the receiver. In another embodiment, $GP_k$ is unknown at the receiver but it can be known by the receiver if it was reliably encoded and if the receiver decodes it. Furthermore, a known format can be used at the transmitter for the generalized prefix. Alternatively, an unknown format can be used with blind format detection being performed at the receiver between a number of allowable formats. In some embodiments, the IFFT size is variable. However, the time duration for the IFFT is preferred to be constant. In preferred embodiments, each transmission unit starts with a generalized prefix and ends with another generalized prefix. In practice, the transmission is typically continuous so that OFDM symbol is one followed by another. In this case, the transmission unit is automatically formed, i.e. one OFDM symbol plus the prefix of the next OFDM symbol as one transmission unit. In some particular cases in packet transmission, it might be the case that only one OFDM symbol needs to be transmitted for a particular user. In this case, it is preferable to transmit a prefix and a suffix (or insert some zeros or ones) for this particular user. This is a system implementation consideration.

Figure 5:
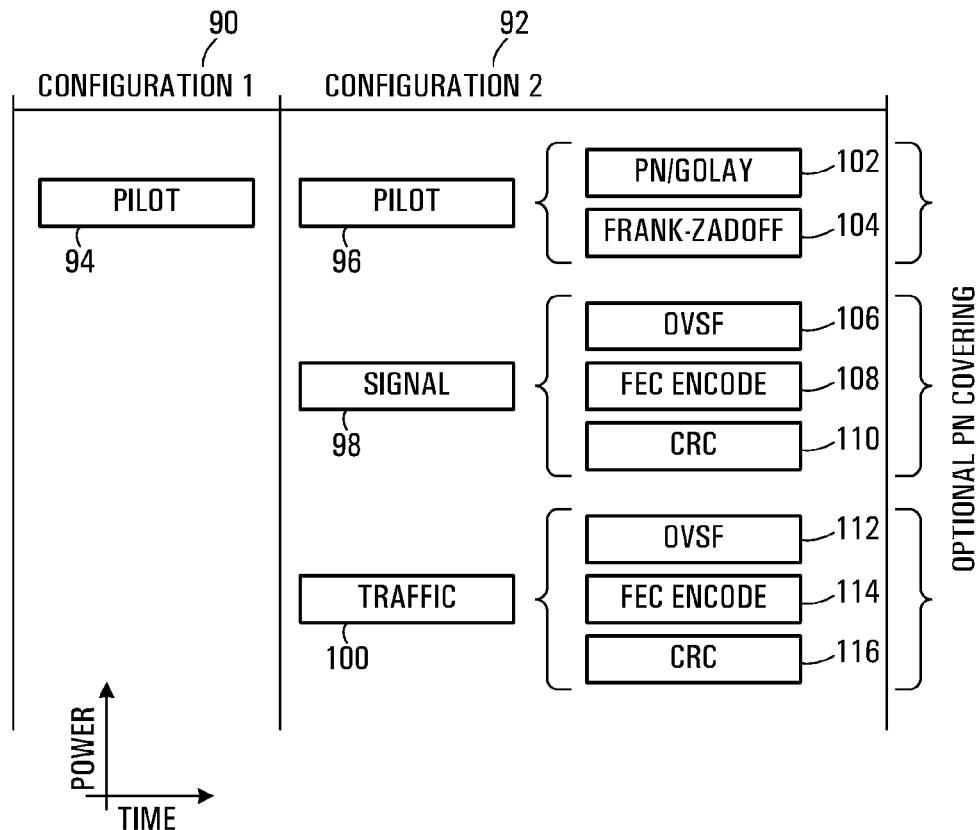
FIG. 5 shows two generalized prefix options.

FIG. 5 shows a first set of generalized prefix structure options. In a first configuration 90, only a pilot channel 94 is transmitted during the generalized prefix period this will be known both at the transmitter and the receiver. In a second configuration 92, pilot 96, signalling 98 and a traffic 100 are transmitted simultaneously during the generalized prefix. They are separated by the use of various codes. In the illustrated example, a PN/Golay 102 or Frank-Zadoff 104 code is employed for the pilot. An OVSF (Orthogonal Variable Spreading Factor) 106, FEC Encode 108 or CRC 110 is used for the signalling 98. Finally, an OVSF 112, FEC Encode 114 or CRC 116 is used for the traffic. Each of the three channels optionally has PN covering as well. OVSF is a terminology in 3GPP/UMTS. This orthogonal code spreading is for signalling data or traffic data transmission with appropriate reliability requirements. PN, Golay, or Frank-Zadoffe are all regarded as PN sequences with different correlation properties. As such, they can be used as training sequence or pilot. Here they are used as prefix. Note that here pilot, signalling and traffic are time overlapped during the prefix duration. It is really a replica of a CDMA channel in this period.

Figure 6:
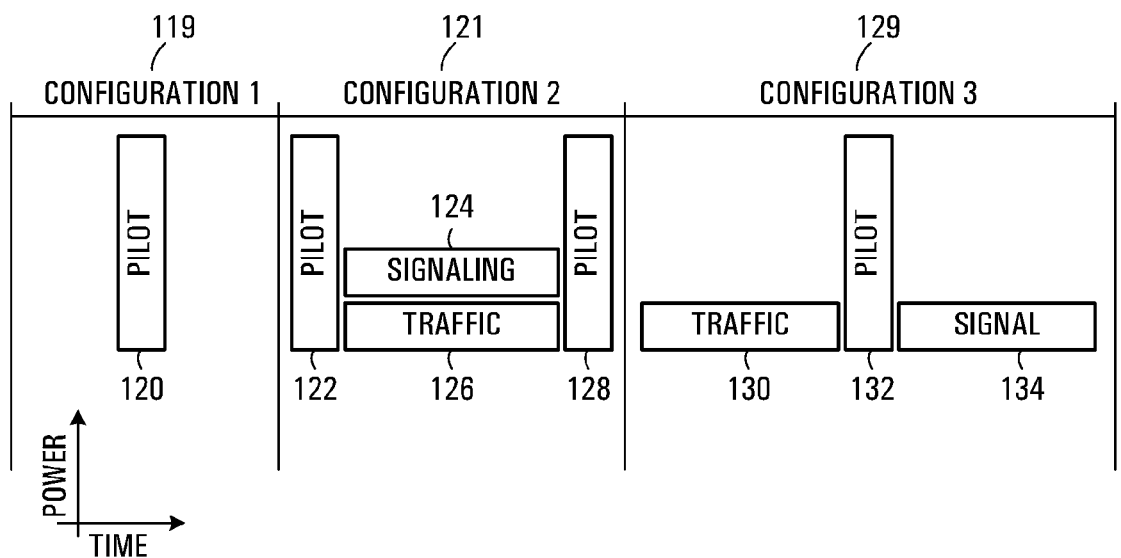
FIG. 6 shows three more generalized prefix structure options.

FIG. 6 shows three more options for the generalized prefix structure. In a first configuration 119, only the pilot channel is transmitted. In a second option 121 the generalized prefix is divided up time wise to have three periods of transmission. During the first period, a pilot signal 122 is sent. During the second period, both signalling 124 and traffic 126 are transmitted using some appropriate channel separation. Finally, during a third period more pilot channel 128 is transmitted. In a third example, the generalized prefix is again divided into three time periods. During the first period, traffic 130 is transmitted. During a second period, a pilot channel 132 is transmitted. Finally, during a third period signalling 134 is transmitted.

In the examples of FIGS. 5 and 6, the horizontal axis represents time and the vertical axis represents power. Thus, the pilot 120 of example 119 is transmitted for a short period at a large power whereas the pilot 94 of example 90 is transmitted for a longer time but a lower power.

It is noted that in any of these options, depending upon the deployment environment, the pilot can be present in every generalized prefix, or only periodically. For embodiments that do not require a pilot, no pilot channel would be present in the generalized prefix.

Figure 7:
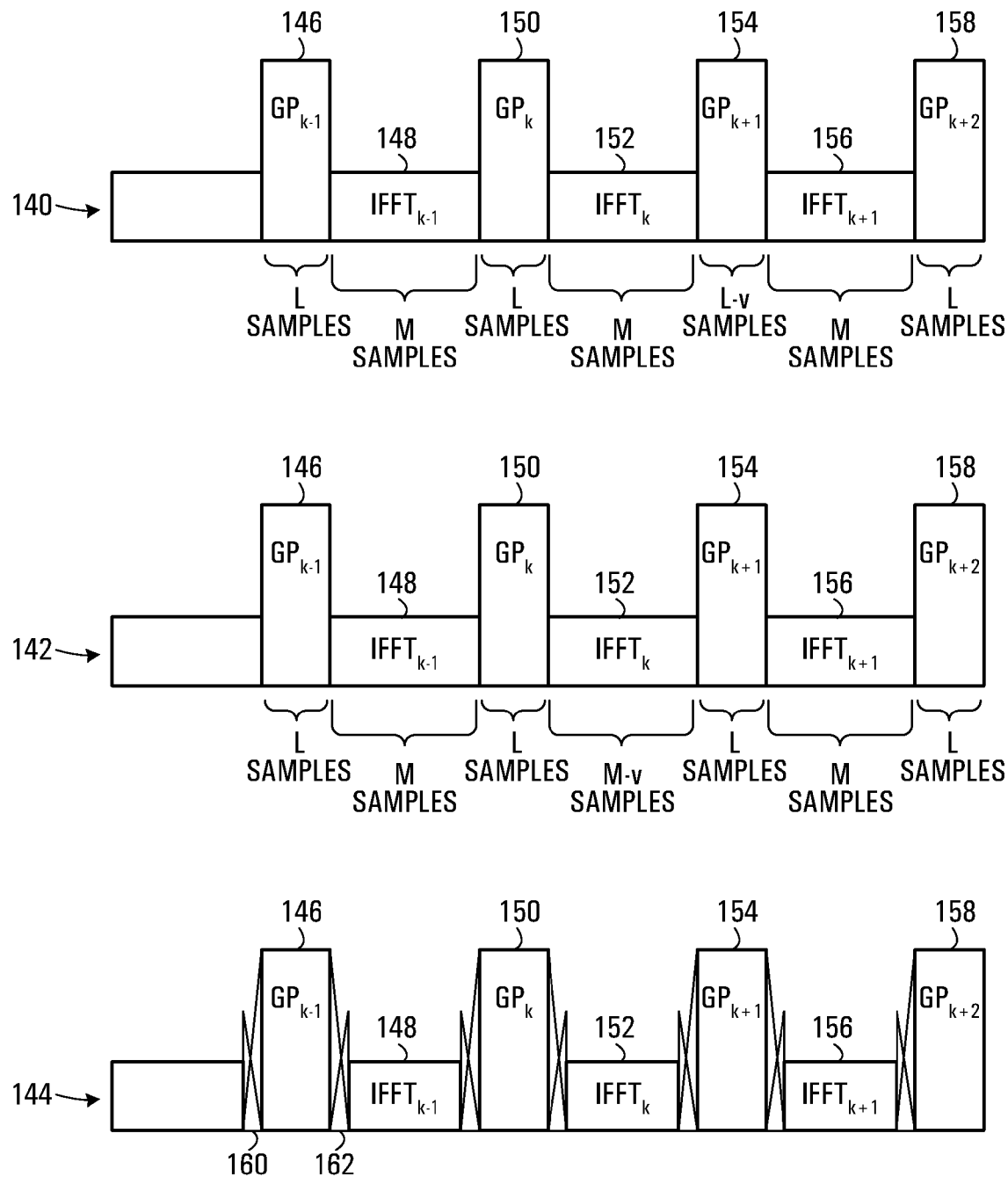
FIG. 7 shows how frame/slot timing, sampling frequency and time windowing can be employed in various embodiments of the invention employing the generalized prefix.

Various options exist for frame/slot timing, sampling frequency and time windowing. Referring to FIG. 7, a first example is indicated generally at 140. With this example, a sequence of IFFTs 148,152,156 is transmitted, and each of these contains an identical number of samples, namely M. Preceding each IFFT 148,152,156 is a respective generalized prefix 146,150,154, and another generalized prefix 158 is shown following IFFT 156. In this example, the first, second and fourth illustrated generalized prefix is 146,150,158 each contains L samples whereas the third generalized prefix 154 is shown to contain L-v samples. This is intended to illustrate that the number of samples which are transmitted during the generalized prefix does not need to be a constant.

A second example is generally indicated at 142. The same sequence of generalized prefixes 146,150,154,158 and IFFTs 148,152,156 is illustrated. In this example, all of the generalized prefixes are shown to have a constant number of samples equal to L. However, the first and third IFFTs 148, 156 are shown to have M samples whereas the second IFFT 152 in this example has M-v samples. This example is intended to illustrate that the number of samples transmitted during the IFFT does not need to be fixed. The size of the IFFT used can change from one transmission period to another.

A third example is generally indicated at 144. This example again shows the same sequence of IFFTs 148,152,156 and generalized prefixes 146,150,154,158. However, in this example, there is a respective guard band between each IFFT and each generalized prefix. For example, guard bands 160 and 162 are shown on either side of generalized prefix 146. These guard bands can be used for at least two purposes. Firstly a guard band provides an extra separation in time between a generalized prefix and an IFFT period and will thus reduce the interference between the two components. Furthermore, guard bands can be inserted to get a best fit for the IFFT. For example, if the IFFTs do not contain the proper number of samples for the fastest IFFT (namely a power of 2) these guard bands can be inserted in order to make the number of samples appropriate for a fast IFFT.

The above discussion has focused on the content of transmitted signals generated at transmitters. Further details are provided below of various options for the timing of the generalized prefix and the IFFTs. Some of these embodiments have the objective of allowing these IFFT slots to be easily overlaid within existing transmission standards. This is possible because the generalized prefix and the IFFT are unrelated.

Another embodiment of the invention provides a receiver adapted to receive signals containing the generalized prefixes and IFFT block periods. The receiver is different from conventional receivers in that it needs to be able to process the generalized prefixes and to remove their effects in terms of GP ISI upon IFFT blocks. Furthermore, in the event timing and frequency synchronization or channel measurement are to be performed, these functions would be included in the receiver. Finally, as discussed in the background of the invention section it is advantageous if the IFFT can be considered to be a cyclic convolution with the channel at the receiver. Some embodiments of the invention employ a novel method of converting a linear convolution to a cyclic convolution. The advantages of this are expanded upon further below. It is to be understood that different receiver implementations will employ various different combinations of these features and that not necessarily all of them need to be included in a given implementation.

In one embodiment, the generalized prefix is used at the receiver to perform correlation-based timing synchronization based on an a priori known generalized prefix or embedded pilot in the generalized prefix. Frequency offset estimation is performed based on the embedded pilot in generalized prefix or after the generalized prefix is detected. Finally, in another embodiment signal strength measurement is used to facilitate the beam forming/MIMO processing. As the prefix is a known or can be known training sequence. Traditional beam forming algorithms can be applied on those known portions of data and then beam forming weights can be calculated. MIMO processing can be realized by assign different prefixes to different antennas so that the MIMO channel matrix can be estimated. Those prefixes can be assigned either overlap in time or in a TDM fashion (those prefixes will not overlap in time). One example of prefixes for 2 transmitters is: T×A: (A1 0 A2 0 ... An 0), T×B: (0 B1 0 B2 ... 0 Bn)]

Figure 8:
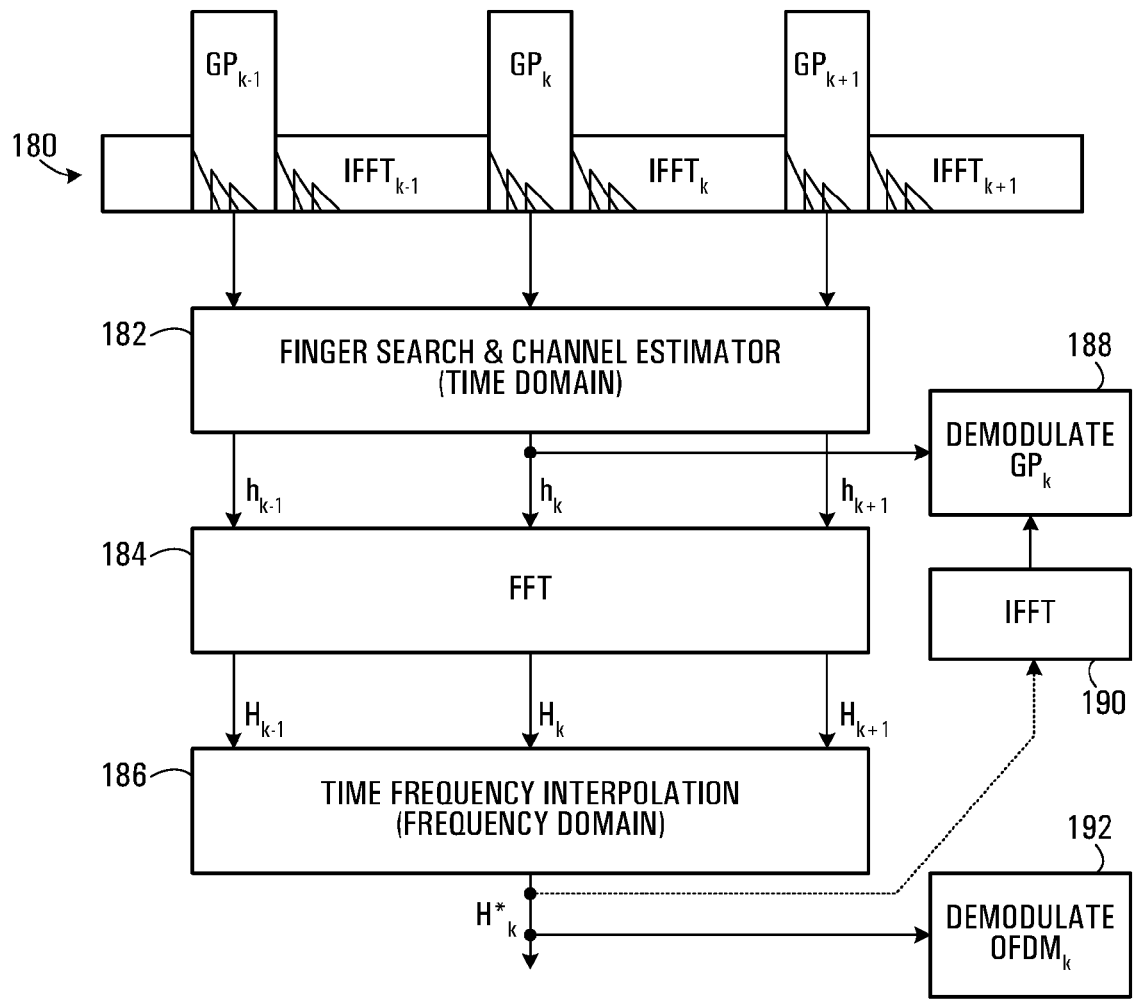
FIG. 8 is a flowchart of how time-frequency turbo channel estimation can be employed in receivers within systems employing the generalized prefix.

FIG. 8 shows a flowchart of a first method of performing channel estimation using the generalized prefix. To begin, a receive signal generally indicated at 180 is received. This contains the generalized prefix, the IFFT, and the various ISI components as discussed previously. At step 182, a finger search and channel estimation is performed in the time domain. This is done based on the known pilot channel information transmitted during the generalized prefix and is usually done using a correlation method. This amounts to determining where the multi-path components are in the received signal and what the signal strengths of each multi-path component are. Using this, a good estimate of the channel can be determined according to:

$$ch(t) = \sum_{i=1}^{L} \alpha_i p(t - \tau_i) \qquad \text{Equation 1}$$

where ch(t) is the channel response as a function of time t, L is the number of multi-path components, $\alpha_i$ is the strength of the ith multi-path component, and $p(t-\tau_i)$ is the shaping filter response delayed by the delay $\tau_i$ of the ith multi-path component. By sampling the channel response during the various channel estimation periods, multiple time domain channel estimates are produced. In the illustrated example, these are indicated at $h_{k-1}$, $h_k$ and $h_{k+1}$. These are fed through an FFT function 184 which produces respective frequency domain channel responses $H_{k-1}$, $H_k$ and $H_{k+1}$. These are interpolated in time and/or frequency at step 186 to produce an overall frequency domain channel estimate $H^*_k$ for a given channel estimation. This channel estimate $H^*_k$ is used to demodulate the kth OFDM symbol as generally indicated at 192. Various examples of how the OFDM symbol is demodulated are provided below. It is also noted that the channel estimate can be improved by converting it back to the time domain with an IFFT function 190 and using this as an input to the finger search and channel estimator to get better estimates of the time domain channel response. The loop of steps 182,184,186 and 190 can be repeated to improve the channel estimate. Also shown in the flowchart is the demodulation of the generalized prefix at 188 using either the time domain channel response output at step 182 or the time domain channel response generated by the IFFT 190.

It is noted that in some embodiments, only the stronger fingers are tracked to generate an estimate of the channel response $\hat{ch}(t)$ the interpolation in time and frequency domain can be performed as indicated at 186 of FIG. 8 to perform a better estimate of the channel response.

Figure 9:
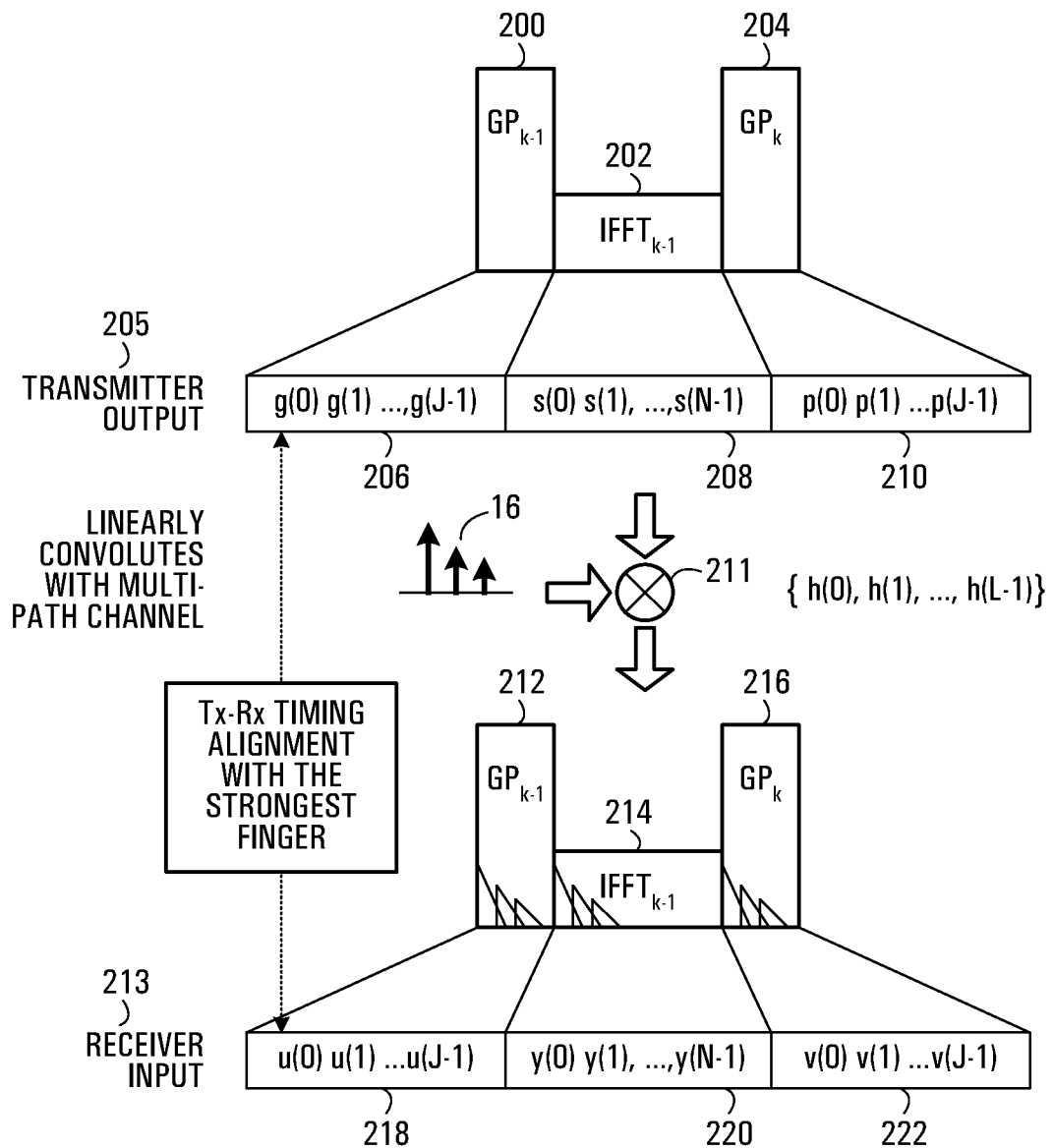
FIG. 9 shows how time domain least mean squares based channel estimation can be employed in systems employing the generalized prefix at the transmitter.

Another method of performing channel estimation will now be described with reference to FIG. 9. This method can be considered to be an alternative to that described above with reference to FIG. 8. It is to be clearly understood other methods of channel estimation can be employed. To begin the various notations to be used will be described. The transmitter output, generally indicated at 205 is shown to include a generalized prefix $GP_{k-1}$ 200 followed by an $IFFT_{k-1}$ 202 followed by generalized prefix $GP_k$ 204. The samples contained in the generalized prefix $GP_{k-1}$ 200 are generally indicated at 206 and consist of g(0), g(1), ..., g(J-1). The samples contained in the $IFFT_{k-1}$ 202 are indicated at 208 and consist of s(0), s(1), ..., s(N-1). The samples contained in the following generalized prefix $GP_k$ 204 are indicated at 210 and consist of p(0), p(1), ..., p(J-1). The transmitter output 205 is convoluted by the channel as indicated at 211. This is a linear convolution with the channel response. The channel response is indicated in the discrete time domain to be {h(0), h(1), ..., h(L-1)}. The sequence h(i) is a discrete time sampled version of the channel impulse response.

The receiver input is generally indicated at 213. At the receiver open eye searching is performed for the strongest finger/multi-path, and the received samples are aligned using the strongest finger open eye position. The received signal is shown to include the received version of $GP_{k-1}$ 212, the received version of $IFFT_{k-1}$ 214 and the received version of $GP_k$ 216. The received samples of $GP_{k-1}$ 212 are indicated at 218 and consist of u(0), u(1), ..., u(J-1). The receiver samples for $IFFT_{k-1}$ 214 are indicated at 220 and consist of y(0), y(1), ..., y(N-1). Finally the received samples for $GP_k$ 216 are indicated at 222 and consist of v(0), v(1), ..., v(J-1). At the receiver, the samples g(0), ..., g(J-1) and p(0), ..., p(J-1) are either known, or they are knowable by performing a decoding/demodulation process on the generalized prefix. Equations for these samples can be generated as a function of the received symbols and the sampled channel response. More specifically, in respect of the samples in the first generalized prefix 200 the following set of equations can be defined:

$$\begin{bmatrix} p(0) & p(1) & \dots & p(L-1) \\ p(1) & p(2) & \dots & p(L) \\ \dots & \dots & \dots & \dots \\ p(J-L) & p(J-L+1) & \dots & p(J-1) \end{bmatrix} \qquad \text{Equation 2}$$

$$\begin{bmatrix} h(L-1) \\ h(L-2) \\ \vdots \\ h(0) \end{bmatrix} + \begin{bmatrix} N'(0) \\ N'(1) \\ \vdots \\ N'(L-1) \end{bmatrix} = \begin{bmatrix} v(L-1) \\ v(L) \\ \vdots \\ v(J-1) \end{bmatrix}$$

Furthermore, in respect of the samples of the following generalized prefix 204, the following set of equations can be defined:

$$\begin{bmatrix} g(0) & g(1) & \ldots & g(L-1) \\ g(1) & g(2) & \ldots & g(L) \\ \ldots & \ldots & \ldots & \ldots \\ g(J-L) & g(J-L+1) & \ldots & g(J-1) \end{bmatrix} \begin{bmatrix} h(L-1) \\ h(L-2) \\ \vdots \\ h(0) \end{bmatrix} + \quad \text{Equation 3}$$

$$\begin{bmatrix} N(0) \\ N(1) \\ \vdots \\ N(L-1) \end{bmatrix} = \begin{bmatrix} u(L-1) \\ u(L) \\ \vdots \\ u(J-1) \end{bmatrix}$$

In the above equations, the values N(0) ... N(L−1) are noise samples during the first generalized prefix, and the values N'(0) ..., N'(L−1) are noise samples for the following generalized prefix period. Each generalized prefix can be used to generate J-L equations where L is the number of samples in the discrete impulse response and J is the number of known samples. These equations can be solved for the discrete channel impulse response {h(0), ..., h(L−1)}. In preferred embodiments, J is designed much larger than L, say if J=2L. This results in 2L equations with L unknowns. The solution will be a least mean square solution as there are noise terms. the larger the number of equations, the better the estimation accuracy. Thus, additional equations can be staggered together to enhance estimation accuracy. This gives an overall time domain channel response that can be used to generate a frequency domain channel response Referring now to FIG. 10, a further receiver functionality will now be described which allows the receiver input to be converted into a cyclic convolution as provided by another embodiment of the invention. For cyclic convolution, a sequence of samples $s_0, s_1, \ldots, s_{N-1}$ convoluted with a sequence $h_0, \ldots, h_{L-1}$ where L is less than or equal N yields a resulting sequence $z_n$ defined as follows:

$$z_n = \sum_{k=0}^{N-1} s_k h_{n-k}, n = 0, \ldots, N-1 \quad \text{Equation 4}$$

where ($h_k$) is zero padded and cyclically extended. This is to be contrasted with a linear convolution of the same two sequences which would be defined as using the same equation as above, but for a linear convolution the sequence {$h_k$} is not zero padded and cyclically extended. Rather, $h_k=0$ if k is less than 0 and $h_k=0$ if k is greater than or equal to L.

The advantage of a cyclic convolution is that there is a very simple convolution theorem which holds true in the frequency domain. The convolution theorem is as follows:

$$Z_n = S_n \cdot H_n \quad \text{Equation 5}$$

where $$Z = DFT\begin{pmatrix} z_0 \\ \vdots \\ z_{N-1} \end{pmatrix}$$

$$S = DFT\begin{pmatrix} s_0 \\ \vdots \\ s_{N-1} \end{pmatrix}$$

$$H = DFT\begin{pmatrix} h_0 \\ \vdots \\ h_{N-1} \end{pmatrix}$$

where DFT is a Discrete Fourier Transform.

This formula only holds true for cyclic convolutions. The advantage of this is that if in this equation H is considered to be the channel response, S is the transmitted signal and Z is the received signal, the effect of the channel can be removed by simply dividing the received signal by the determined channel response. Again, this is only true for cyclic convolutions.

Figure 10:
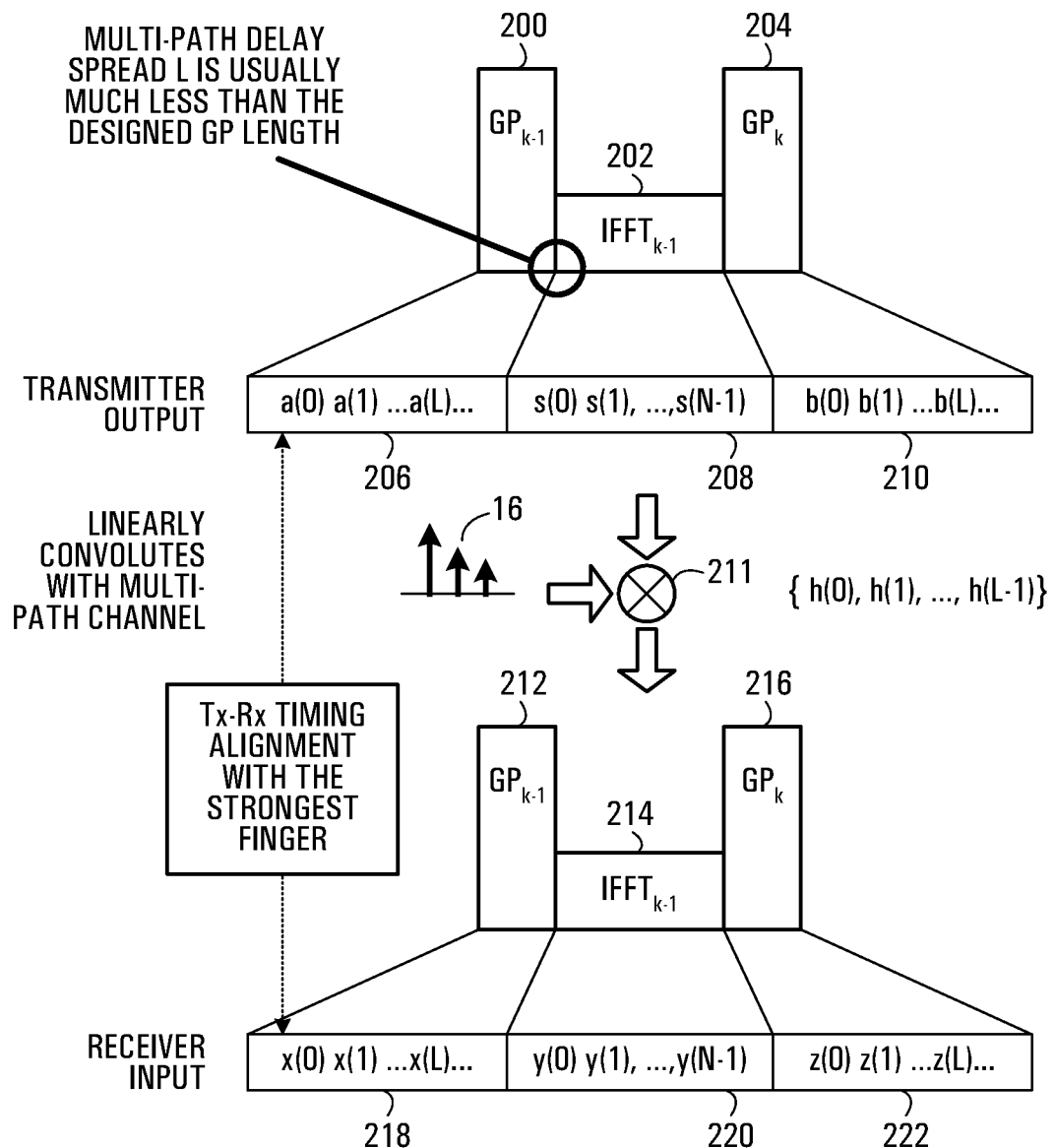
FIG. 10 shows a transmitter output and receiver input, for the purpose of defining notation for the de-convolution theorem.

An embodiment of the invention provides a method of pre-processing the receiver input such that mathematically the new receiver input was cyclically convoluted with the channel, and as such the above discussed convolution theorem applies and the effect of the channel response can be easily removed. For the purpose of illustrating how this adjustment is made, the notation introduced in FIG. 10 will be used. FIG. 10 is actually the same as FIG. 9, but only portions of the GPs are shown. For indexing convenience, different notations have been used comparing to FIG. 9. The notation used here only shows the last L samples of g(0), g(1), ..., g(J−1) for which a new notation a(0)=g(J−L), ..., a(L−1)=g(J−1) is used for indexing convenience. There is no change from FIG. 9 for the data portion s(0), ..., s(N−1) for the IFFT. Finally, b(0)=p(J−L), ..., b(L−1)=p(J−1) for the samples of the second generalized prefix which follows the IFFT. As before, this is convoluted with the multi-path channel having a discretized channel response {h(0), ..., h(L−1)}. The receiver input, after alignment with the strongest finger is x(0), ..., x(L−1) for the first generalized prefix. For the IFFT, the receiver input is y(0), ..., y(N−1). For the following generalized prefix, the receiver input is z(0), ..., z(L−1).

As discussed previously with reference to FIG. 9, the discretized channel response can be determined by solving the equations presented above. It is noted that other methods of determining the discretized channel response can alternatively be employed. Now, define (L−1)×(L−1) upper and lower matrices U and W, respectively, as $$U = \begin{bmatrix} h(L-1) & h(L-2) & \ldots & h(1) \\ 0 & h(L-1) & \ldots & h(2) \\ \ldots & \ldots & \ldots & \ldots \\ 0 & 0 & \ldots & h(L-1) \end{bmatrix},$$

$$W = \begin{bmatrix} h(0) & 0 & \ldots & 0 \\ h(1) & h(0) & \ldots & 0 \\ \ldots & \ldots & \ldots & \ldots \\ h(L-2) & h(L-3) & \ldots & h(0) \end{bmatrix}$$

Redefine y(0), y(1), ..., y(L−2) as $$\begin{bmatrix} y(0) \\ y(1) \\ \vdots \\ y(L-2) \end{bmatrix} = \begin{bmatrix} y(0) \\ y(1) \\ \vdots \\ y(L-2) \end{bmatrix} - \quad \text{Equation 6}$$

$$U\begin{bmatrix} a(1) \\ a(2) \\ \vdots \\ a(L-1) \end{bmatrix} + \begin{bmatrix} z(0) \\ z(1) \\ \vdots \\ z(L-2) \end{bmatrix} - W\begin{bmatrix} b(0) \\ b(1) \\ \vdots \\ b(L-2) \end{bmatrix}$$

Then $\{y(0), y(1), \ldots, y(N-1)\} = \{s(0), s(1), \ldots, s(N-1)\}\{h(0), h(1), \ldots, h(L-1)\}$, represents Cyclic Convolution. In other words, by performing the above discussed transformation upon the received samples $y(0), \ldots, y(N-1)$ to yield new receiver inputs (the same notation for the new inputs is used in the above equation) the samples then represent a cyclic convolution between the transmitted samples and the channel.

In order to illustrate the principle behind this process, the following equations can be written to describe the system output which is the linear convolution between the transmitter output, ... a(0) a(1) s(0) s(1) s(2) s(4) s(5) s(6) b(0) b(1) ... and the channel h(0) h(1) h(2) (L=3 in this case):

$$x(0) = s(0)h(0) + a(1)h(1) + a(0)h(2)$$

$$x(1) = s(1)h(0) + s(0)h(1) + a(1)h(2)$$

$$x(2) = s(2)h(0) + s(1)h(1) + s(0)h(2)$$

$$x(3) = s(3)h(0) + s(2)h(1) + s(1)h(2)$$

$$x(4) = s(4)h(0) + s(3)h(1) + s(2)h(2)$$

$$x(5) = s(5)h(0) + s(4)h(1) + s(3)h(2)$$

$$x(6) = s(6)h(0) + s(5)h(1) + s(4)h(2)$$

$$x(7) = b(0)h(0) + s(6)h(1) + s(5)h(2)$$

$$x(8) = b(1)h(0) + b(0)h(1) + s(6)h(2)$$

Now compare this to what would be the output of a cyclic convolution between the transmitted IFFT sequence $\{s(0), \ldots, s(6)\}$ convoluted cyclically with the channel $\{h(0)\ h(1)\ h(2)\}$ which would be as follows:

$$z(0) = s(0)h(0) + s(6)h(1) + s(5)h(2)$$

$$z(1) = s(0)h(1) + s(1)h(0) + s(6)h(2)$$

$$z(2) = s(2)h(0) + s(1)h(1) + s(0)h(2)$$

$$z(3) = s(3)h(0) + s(2)h(1) + s(1)h(2)$$

$$z(4) = s(4)h(0) + s(3)h(1) + s(2)h(2)$$

$$z(5) = s(5)h(0) + s(4)h(1) + s(3)h(2)$$

$$z(6) = s(6)h(0) + s(5)h(1) + s(4)h(2)$$

Our target is to convert the vector $x(0), x(1), \ldots, x(6)$ to be an output of cyclic convolution of $\{s(0), \ldots, s(6)\}$ and $\{h(0)\ h(1)\ h(2)\}$.

Comparing the equations above to the system output defined by the linear convolution, we can see that the equations for $z(2), \ldots, z(6)$ are identical to the linear convolution output $x(2), \ldots, x(6)$ and as such are obtainable directly from the system output. However, the equations for $x(0), x(1)$ are different from the system output of cyclic convolution (refer to equation 6 that we need to redefine these 2 samples to force them to be the output of cyclic convolution, i.e. $z(0)$ and $z(1)$. However, $z(0)$ and $z(1)$ can be obtained, respectively, from the output of the linear convolution system, i.e. from combinations of $x(7)$ and $x(0)$ and $x(8)$ and $x(1)$. In fact, $z(0) = [x(7) - b(0)h(0)] + [x(0) - a(1)h(1) - a(0)h(2)]$ and $z(1) = [x(1) - a(1)h(2)] + [x(8) - b(1)h(0) + b(0)h(1)]$.

The above described adjustment made to the received samples is designed to change the system output from the linear convolution to the above discussed cyclic convolution. The effect of the above discussed adjustment is just to calculate $y(0), y(1)$ with the received data samples $x(0), x(1), x(7)$ and $x(8)$ and the known data $h(0), h(1), h(2)$ and $a(0), a(1)$ and $b(0), b(1)$ in the above example.

Figure 11:
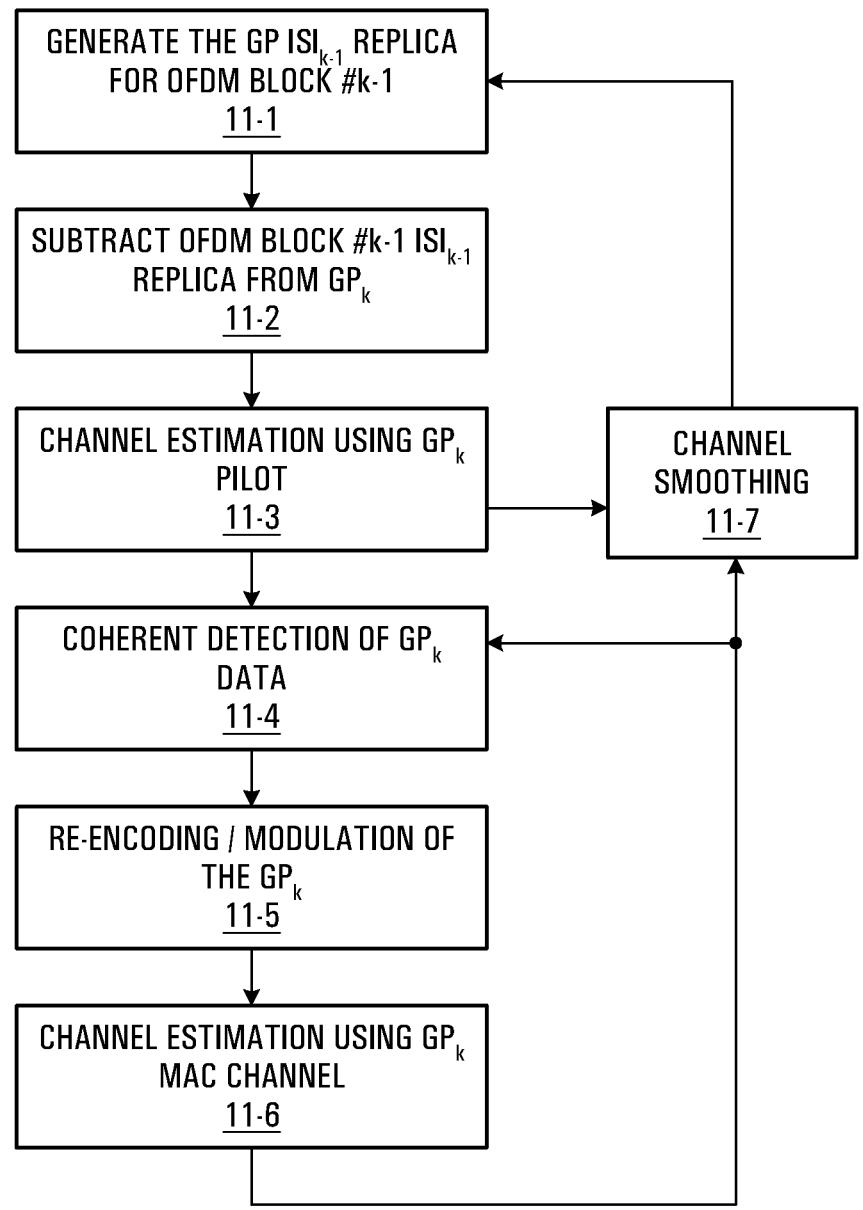
FIG. 11 is a flowchart of an example method of turbo generalized prefix removal.

Referring now to FIG. 11, shown is a flowchart of a method of turbo generalized prefix removal, provided by an embodiment of the invention. This begins at step 11-1 by generating the GP $ISI_{k-1}$ replica for OFDM block #k−1. At step 11-2, the OFDM block #k−1 $ISI_{k-1}$ replica is subtracted from $GP_k$. At step 11-3 channel estimation is conducted using the $GP_k$ pilot. The output of this is used for coherent detection of $GP_k$ data in step 11-4. The data is then re-encoded and modulated at 11-5. Then channel estimation is done using $GP_k$ MAC channel in step 11-6. The outputs of steps 11-3 and 11-6 together are used to perform a channel smoothing function at 11-7. The output of this function is used to generate the GP ISI replica.

Figure 12:
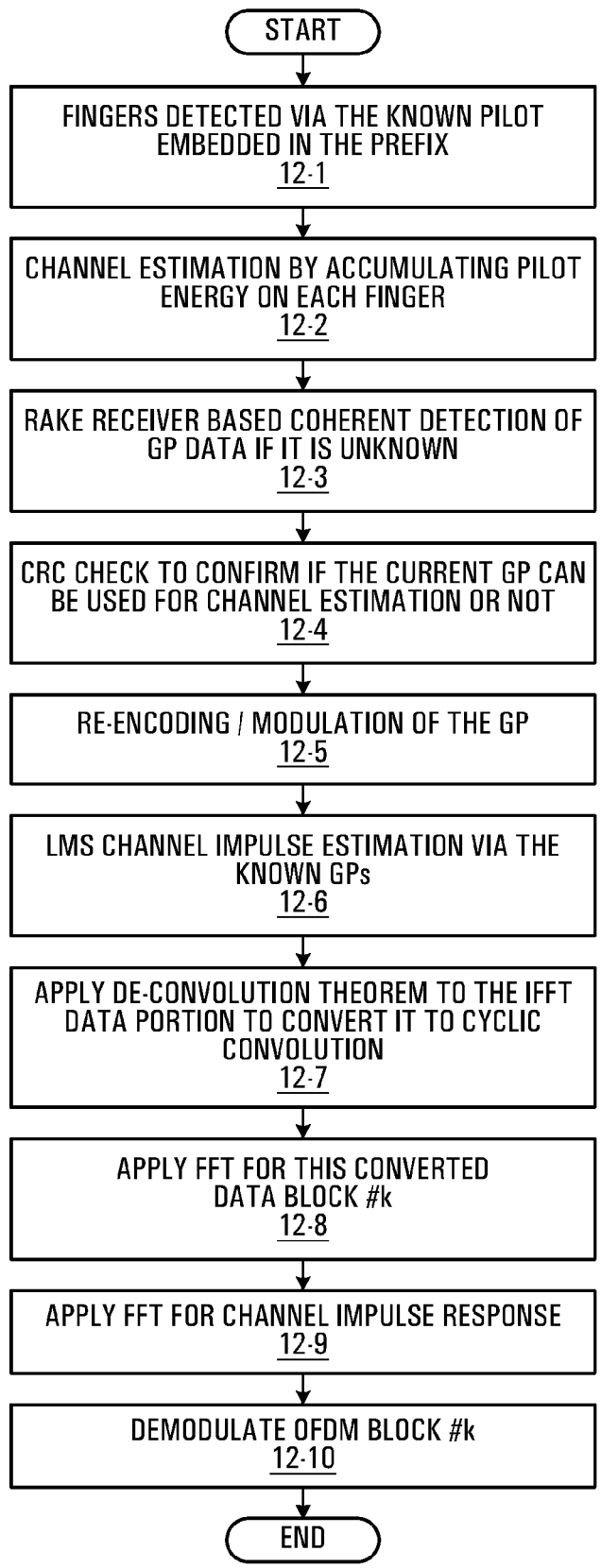
FIG. 12 is a flowchart of a generic reception procedure in a receiver in a system employing the generalized prefix.

FIG. 12 is a flowchart of a generic reception procedure. At step 12-1, finger detection is performed by known methods, for example by using the known pilot embedded within the generalized prefix. At step 12-2, channel estimation is performed by accumulating pilot energy on each finger. At step 12-3, RAKE based coherent detection of generalized prefix data is performed if the data content is unknown. At step 12-4, a CRC check is performed to confirm whether or not the current generalized prefix can be used for channel estimation or not. At step 12-5, the generalized prefix is re-encoded/modulated. At step 12-6, the channel impulse estimation is performed, for example using least means squares algorithm, using the known generalized prefix data. At step 12-7, the above described de-convolution theorem is applied to the IFFT data portion of the received signal to convert it to a cyclic convolution. At step 12-8, an FFT function is applied to this converted data to convert it back into the frequency domain for data block #k. At step 12-9, an FFT is also applied to the channel impulse response. At step 12-10, the OFDM block #k is demodulated. This can be as simple as dividing the FFT for the channel impulse response since the convolution theorem holds true as results of the cyclic convolution.

Advantageously, the new systems and methods can be adapted for use in the context of many different existing standards. Various system embodiments will now be described. It is to be understood that while the invention is applicable in all of these system embodiments, other applications may alternatively be employed.

Figure 13:
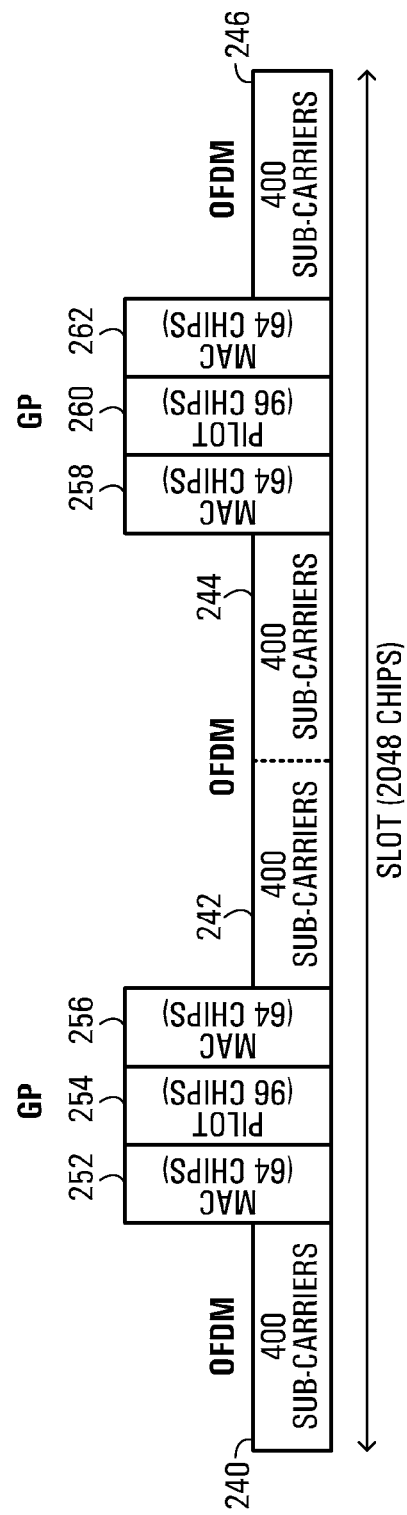
FIG. 13 shows a first system embodiment adapted for use over the 1×EV/DO forward link.

FIG. 13 shows a first system embodiment adapted for use over the 1×EV/DO forward link. In this embodiment a single slot is 2048 chips in duration. This slot structure features an 800 point DFT with one half slot leg DFT modulation and demodulation. Preferably, the MAC channel spreading gain is selected to be sufficient to combat the ISI in the worst delay spread channel scenarios with highly successful MAC channel decoding rate. Except for the OFDM modulation and demodulation, this new slot structure/frame structure allows a 100% re-use of the existing IS-856 physical and MAC layers. The slot structure begins with a 400 sub-carrier OFDM period 240. This is followed by a generalized prefix indicated as $GP_k$ which has three TDM portions, namely a first MAC segment 252 followed by a pilot segment 254 followed by a second MAC segment 256. This is followed by two 400 sub-carrier OFDM periods 242,244 which in turn is followed by another generalized prefix $GP_{k+1}$ which has MAC pilot and MAC segments 258,260 and 262 respectively. This is followed by another 400 sub-carrier OFDM period 246. It is to be understood that in the context of this example, the size of the various FFTs and MAC and pilot segments has been provided by way of example only, and that other values can be alternatively employed.

In this embodiment, the second IFFT 244 preferably uses a different set of sub-carriers from the first IFFT 242, for a total of 800 sub-carriers. Then, the OFDM transmission can be regarded as a single 800 sub-carrier OFDM symbol, and for the purpose of the prefix, the single generalized prefix will function for the combined OFDM transmission.

Figure 14:
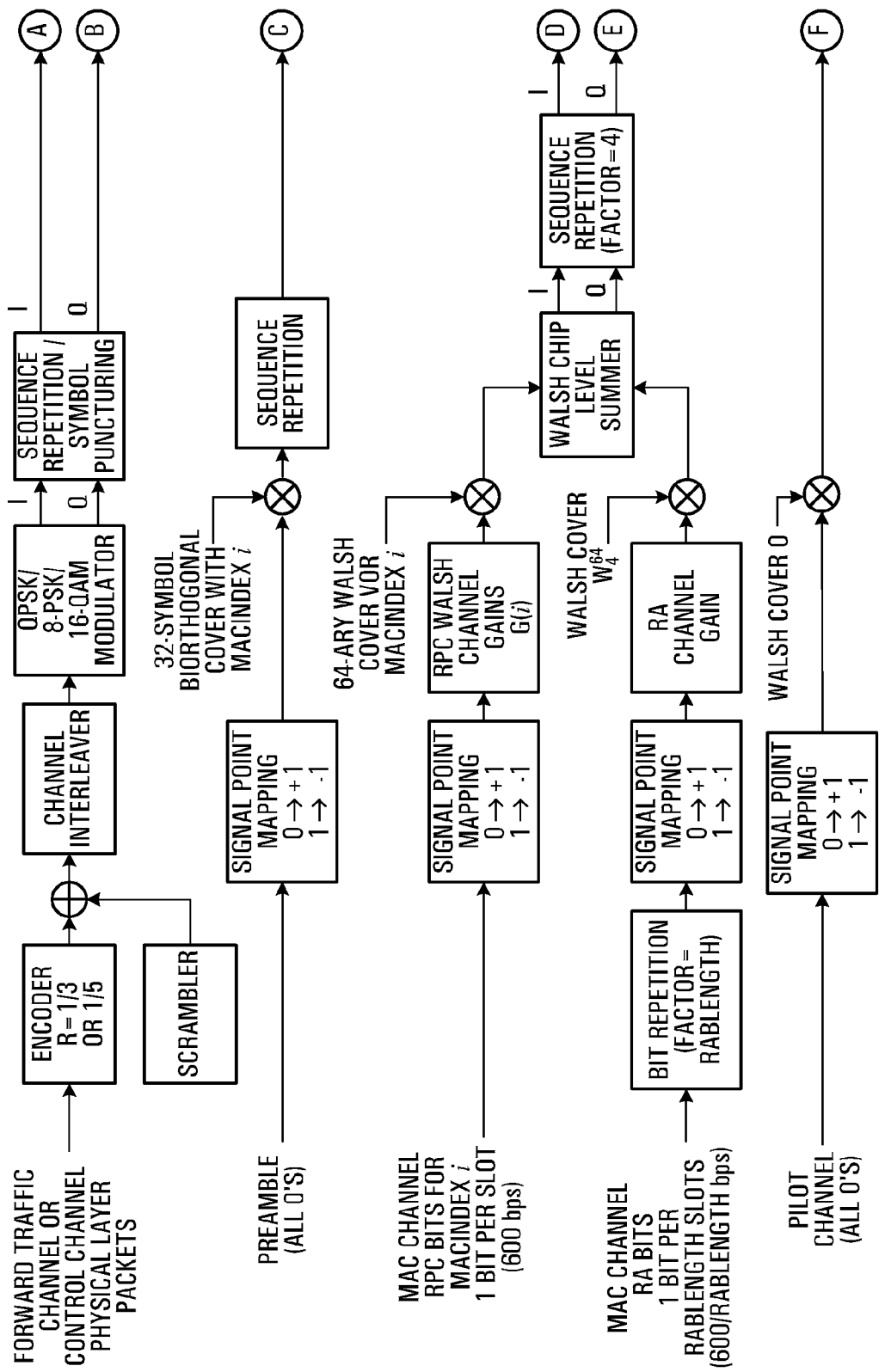
FIG. 14 shows a block diagram of an example GP channel structure.
Figure 14:
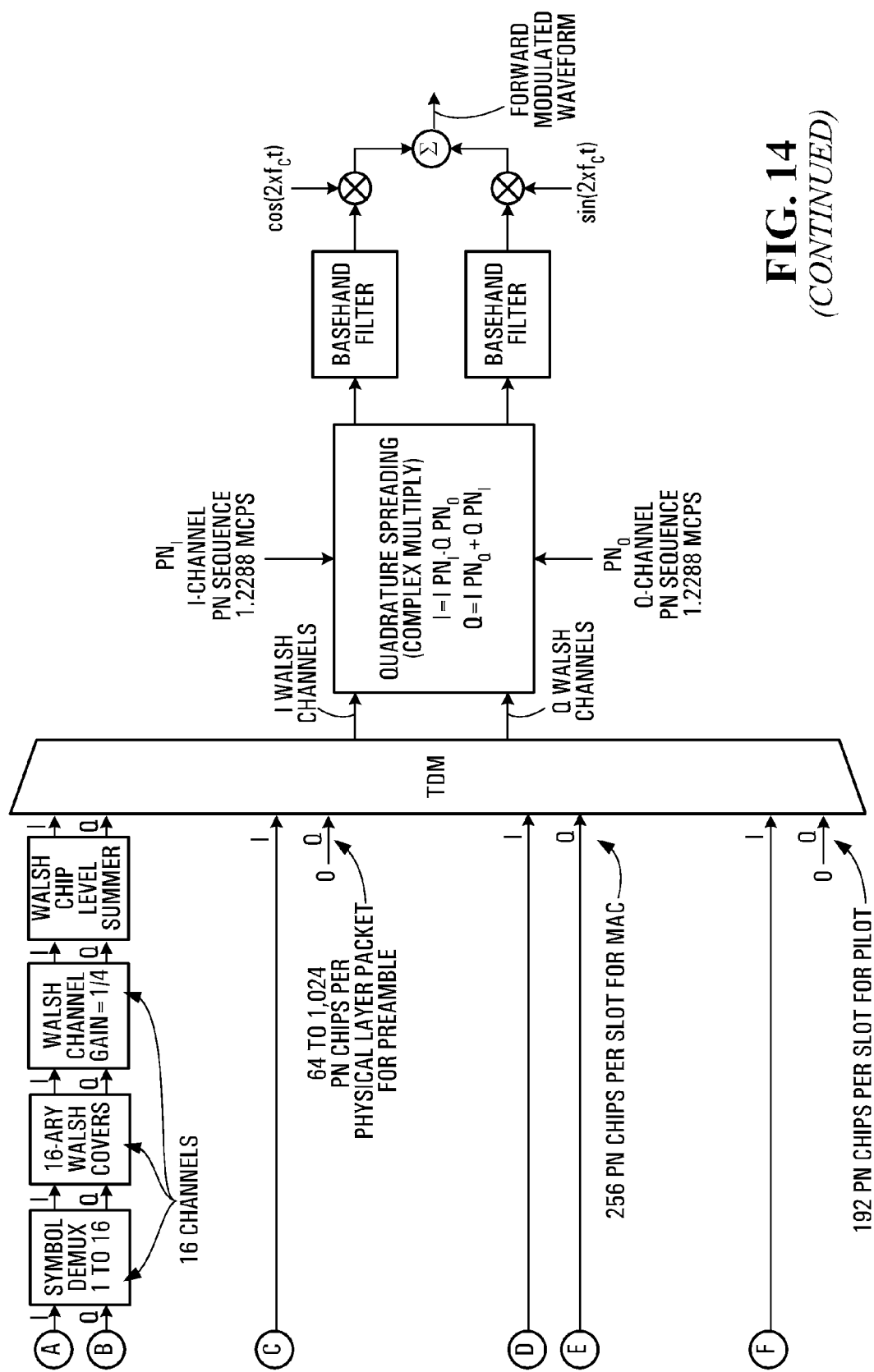

FIG. 14 shows a block diagram of an example generalized prefix channel structure. It is noted that this channel structure is identical to that used in the channel. The only difference then in the transmission is that the data portion which would normally be transmitted using CDMA is replace with an IFFT segment. This makes this approach completely backwards compatible with existing technology.

In a second system embodiment shown in FIG. 15, the 1×EV/DO forward link is extended to a MIMO application. The slot structure shown here is basically the same as that of FIG. 13 although only a portion is shown. Shown are two transmit antennas 324 and 326. The slot structure is transmitted on each of these antennas. Such a multi-antenna system can be used to increase the data rate, for example to double it in the case of two antennas, or alternatively to employ transmit diversity by sending the same data on two different antennas. Each antenna transmits similar FFTs as discussed with respect to FIG. 13. Also, each antenna transmits an antenna specific pilot signal 308 and 320. Signalling data 306 and 310 is transmitted on the first antenna 324 and signalling data 318,322 is shown being transmitted on the second antenna 326. The antenna specific orthogonal pilots are used to facilitate MIMO channel estimation at the receiver. In this example, again 400 sub-carrier FFTs 300,302 and 304 are shown transmitted on the first antenna 324 and FFTs 312,314, 316 are shown on the second antenna 326.

This slot structure can be overlaid directly upon existing 1×EV/DO forward link structures. However, outside the scope of that particular forward link structure, the timing employed for the GP and OFDM FFTs can be varied.

In a third system embodiment shown in FIG. 16, the generalized prefix is applied in the context of a 1×EV/DO forward link with scheduling and backwards compatibility to existing IS-856 specifications. This allows legacy IS-856 terminals to co-exist in the same network by scheduling. In this embodiment, again the slot structure discussed previously with respect to FIG. 13 is employed. The difference here however is that not necessarily all of the data segments are used to transmit FFTs. Rather, some of the data segments can be used to transmit CDMA data for legacy terminals. In the illustrated example, the first and fourth data segments 340 and 346 are shown for transmitting CDMA data whereas the second and third data segments 342,344 are shown transmitting 400 sub-carrier OFDM FFTs. The generalized prefix 350,352 is transmitted as before. This is completely backwards compatible with existing IS-856 specifications and allows legacy IS-856 terminals to co-exist on the same network as new terminals by appropriate scheduling.

FIG. 17 shows a fourth system embodiment featuring a variable spreading factor CDMA and OFDM multiplexing. In this example, the FFTs which are transmitted during the data segments 360,362,364 and 366 are only 208 sub-carrier FFTs. However, they are transmitted still during the full 400 chip duration within the slot so that the slot is still compatible with the existing standards.

FIG. 18 is a fifth system embodiment in which the generalized prefix is applied to the 1×EV/DO reverse link. OFDM is used for the data in place of CDMA. Frequency hopping between OFDM sub-bands is employed to separate the transmissions of different users. FIG. 18 shows the signals transmitted on a single antenna for two users with this embodiment. It is to be understood that this can easily be extending to accommodate additional users. In this embodiment, at least some of the OFDM data transmission periods are used to transmit data from multiple users on different sub-sets of sub-carriers. For example, during a first OFDMA transmission period 300, some of the sub-carriers indicated at 303 are used for user 1 and some of the sub-carriers indicated at 307 are used for user 2. Similarly, during the next OFDMA transmission period 302 the sub-carriers used for user 1 have changed and are now shown at 305. Similarly, the sub-carriers used for user 2 have changed and are now indicated at 309. Thus, there is frequency hopping among the sub-carrier barons for a given user from one OFDMA transmission period to another. The GP structure introduced previously is employed again with a signalling segment followed by a pilot segment followed by another signalling segment. In the illustrate example, the first segment 304 is used for dynamic rate control, this being followed by the pilot segment and another segment for dynamic rate control indicated at 308. Preferably, code separation is used to separate signalling which is being transmitted for user 1 from that used for user 2. Thus at the same time transmissions 304,306,308 are being transmitted for user 1, transmissions 310,312,314 are generated for user 2. There is then user 1 specific DRC, user 2 specific DRC and user 1 specific pilots and user 2 specific pilots. These are able to overlap with each other with CDMA signals. To accommodate additional users, additional control signals/channels can be overlaid in CDMA space during the generalized prefix, and the sub-carriers of the OFDMA transmission periods can be sub-divided further among the additional users.

FIG. 19 is an example OFDM signalling schedule according to a sixth system embodiment which is backwards compatible with the existing IS-856 power controlled CDMA specification. In this embodiment, a 16 slot frame is sub-divided into eight power control groups, with every second slot being used to transmit CDMA in a power controlled manner and every odd slot being used for OFDM burst transmissions. Advantageously, this is backward compatible with existing IS-856 power controlled CDMA.

A seventh system embodiment is shown in FIG. 20. This shows a GSM/GPRS/EDGE downlink overlay. Shown is where 58 bits of the downlink frame structure can be replaced with a 58 point OFDM IDFT. The GSM slot structure is indicated generally at 400. Each slot has three tail bits 402 followed by 57 data bits, a single stealing flag 406 followed by a 26 bit training sequence 408 followed by another stealing flag 410 followed by another 57 data bits for 12 followed by three tail bits 414 followed by an 8.25 bit guard 416. These are transmitted using GMSK modulation in a TDMA fashion. In this embodiment of the invention, during certain transmission periods, the 57 data bits plus the stealing bit are replace with a 58 point IDFT used for OFDM transmission. The new OFDM-GSM downlink slot structure is shown generally indicated at 420. Here we can see that there are now two IDFT 422,424 which are transmitted and in place of data 404,412, and stealing flags 406,410. By scheduling conventional GSM slots together with the new downlink OFDM-GSM slot, legacy GSM terminals can co-exist in the same network as the newly equipped terminals. In this embodiment, the tail bits and/or the training sequence can be used to provide the known/knowable content for the purpose of converting the received IDFT from a linear one to a cyclic one, as described previously.

FIG. 21 shows an eighth system embodiment in which the UMTS downlink is modified to include an OFDM overlay. Further details of this overlay structure are shown in FIGS. 22 and 23. In this embodiment, the standard UMTS channels are indicated generally at 500 and include a primary SCH, secondary SCH pilot channel and dedicated channel. Also shown is the OFDM channel at 502. FIG. 22 shows a first UMTS OFDM slot structure example for use with the system of FIG. 21. In this system, each OFDM slot transmits 128 zeros at the beginning followed by 18×128 IFFT followed by a suffix which is again 128 zeros. This slot structure allows the OFDM to co-exist with the UMTS and is fully backward compatible with 3GPP/UMTS. For the purpose of the prefix, because zeros are transmitted during the first part of each slot, the remaining CDMA signals are directly detectable and can serve the same role as a generalized prefix in previous embodiments, thereby allowing the FFTs to be converted to cyclic convolutions. More specifically, the remaining CDMA signals can be decoded, and then re-generated to function as a non-zero prefix. Any errors in such re-generation will simply appear as noise, as will any CDMA components not factored into the re-generation. FIG. 23 shows another UMTS OFDM slot structure provided by another embodiment of the invention. In this slot structure, each 2560 chip slot is divided into two half slots each containing a respective 128 chip prefix, a 1024 point FFT, and a 128 chip suffix. Each of the prefix and/or suffix can be used to transmit a designed training sequence or system information or for broadcasting, or for sending short messages. As long as these are reliably decodable at the receiver, the above discussed conversion of a linear convolution to a cyclic one can be used based on the generalized prefix concepts discussed earlier. In this case, the prefix would consist of the designed training sequence plus content for the other CDMA channels. As above, any CDMA content not factored in will appear as noise.

A ninth system embodiment is shown in FIG. 24 which shows an IEEE-802.11 a/g system with a variable generalized prefix and/or blind generalized prefix detection. In this case, where in the Standard the prefix was used to contain a copy of the following IFFT block, the generalized prefix is instead used to transmit a variable generalized prefix which may or may not require blind detection at the receiver.

FIG. 25 shows a tenth system embodiment applicable to IEEE 802.16a systems. Similar to FIG. 24, the prefix is again used to transmit a variable generalized prefix instead of the copy of a portion of the following IFFT block.

In the above described embodiments, the generalized prefix is referred to as a "prefix" because in most cases it precedes the OFDM IFFT. More generally, it can be referred to as a non-OFDM segment which will precede and/or follow in such a manner to allow the above discussed conversion from linear to cyclic convolution to be performed.

Also, the combination of an OFDM IFFT and the prefix/suffix/non-OFDM data which enables the conversion between linear and cyclic convolution can be referred to as a transmission unit. Then, a signal comprises a sequence of transmission units. The suffix of one transmission unit may be the prefix of another.

Also, in systems adapted to support legacy equipment, the sequence of transmission units may then contain OFDM transmission units in which the data segment within the transmission unit is and OFDM IFFT, and non-OFDM transmission units in which the data segment of the transmission unit is other than OFDM. Examples given in the description have included CDMA transmission units and GSM transmission units.

In the most simple implementation of the invention however, all that is required is a single OFDM transmission unit.

Novel transmission schemes have been provided which allow the conversion from linear to cyclic convolution at the receiver. From the transmitter perspective, once such a transmission scheme has been established, it is relatively straight forward for one skilled in the art to implement a transmitter to generate the scheme. CDMA transmitters are well known as are OFDM transmitters. For the OFDM symbols, OFDM signal generating circuitry would be required, and similarly for the non-OFDM segments, non-OFDM signal generating circuitry would be required. This could be CDMA circuitry, GSM circuitry etc. all of which is well known.

Numerous modifications and variations of the present invention are possible in light of the above teachings. It is therefore to be understood that within the scope of the appended claims, the invention may be practiced otherwise than as specifically described herein.

We claim:

1. A method, comprising:
   at a receiver:
   receiving a signal containing transmission units from a multi-path channel, each transmission unit containing an OFDM symbol and a respective non-OFDM segment for each OFDM symbol, wherein the respective non-OFDM segment enables a conversion from a linear convolution to a cyclic convolution at the receiver for the OFDM symbol; and
   converting received samples of each OFDM symbol of the linear convolution to a respective new set of received samples of the cyclic convolution based on the respective non-OFDM segment such that the new set of received samples is mathematically equal to the transmitted samples cyclically convoluted from the linear convolution for each OFDM symbol with the channel response of the multi-path channel.

2. A method according to claim 1 further comprising:
   performing finger searching and channel estimation based on the non-OFDM segments to generate for each non-OFDM segment a respective time domain channel estimate;
   performing an FFT function on each time domain channel estimate to generate a respective frequency domain channel estimate;
   performing time frequency interpolation upon multiple frequency domain channel estimates to generate a current frequency domain channel estimate.

3. A method according to claim 2 further comprising:
   performing an IFFT on the frequency domain channel estimate to get a further time domain channel estimate;
   using the further time domain channel estimate to perform finger searching and channel estimating in the time domain to get an improved time domain channel estimate;
   performing the FFT and time frequency interpolation steps again on the improved time domain channel estimate to get an improved current frequency domain channel estimate.

4. A method according to claim 2 further comprising:
   demodulating contents of the non-OFDM segment using the time domain channel estimate.

5. A method according to claim 3 further comprising:
   demodulating contents of the non-OFDM segment using the improved time domain channel estimate.

6. A method according to claim 2 further comprising:
performing demodulation of a current OFDM symbol using the frequency domain channel estimate.

7. A method according to claim 3 further comprising:
performing demodulation of a current OFDM symbol using the improved current frequency domain channel estimate.

8. A method according to claim 1 further comprising:
determining a frequency domain channel estimate;
dividing the new set of received samples by the frequency domain channel estimate on a per-sub-carrier basis.

9. A method according to claim 1, wherein converting received samples of each OFDM symbol to a respective new set of received samples such that the new set of received samples is mathematically equal to the transmitted samples cyclically convoluted with the channel response of the multi-path channel comprises: defining (L−1)×(L−1) upper and lower matrices U and W, respectively, as $$U = \begin{bmatrix} h(L-1) & h(L-2) & \ldots & h(1) \\ 0 & h(L-1) & \ldots & h(2) \\ \ldots & \ldots & \ldots & \ldots \\ 0 & 0 & \ldots & h(L-1) \end{bmatrix},$$

$$W = \begin{bmatrix} h(0) & 0 & \ldots & 0 \\ h(1) & h(0) & \ldots & 0 \\ \ldots & \ldots & \ldots & \ldots \\ h(L-2) & h(L-3) & \ldots & h(0) \end{bmatrix}$$

and defining the new set of samples y(0), y(1), ..., y(L−2) as $$\begin{bmatrix} y(0) \\ y(1) \\ \vdots \\ y(L-2) \end{bmatrix} = \begin{bmatrix} y(0) \\ y(1) \\ \vdots \\ y(L-2) \end{bmatrix} - U \begin{bmatrix} a(1) \\ a(2) \\ \vdots \\ a(L-1) \end{bmatrix} + \begin{bmatrix} z(0) \\ z(1) \\ \vdots \\ z(L-2) \end{bmatrix} - W \begin{bmatrix} b(0) \\ b(1) \\ \vdots \\ b(L-2) \end{bmatrix}$$

where h(.) is a discretized channel response, a(.) are known or highly reliable values for a non-OFDM period preceding the OFDM symbol, b(.) are known or highly reliable values for a non-OFDM period following the OFDM symbol, z(.) are received values for the non-OFDM period following the OFDM symbol, y(.) on the right hand side of the equation are received samples of the OFDM symbol, and y(.) on the left hand side of the equation are the new set of received samples.

10. A method comprising:
converting, at a receiver, a linear convolution to a cyclic convolution for a received OFDM symbol comprising:
defining, at the receiver, (L−1)×(L−1) upper and lower matrices U and W, respectively, as $$U = \begin{bmatrix} h(L-1) & h(L-2) & \ldots & h(1) \\ 0 & h(L-1) & \ldots & h(2) \\ \ldots & \ldots & \ldots & \ldots \\ 0 & 0 & \ldots & h(L-1) \end{bmatrix},$$

$$W = \begin{bmatrix} h(0) & 0 & \ldots & 0 \\ h(1) & h(0) & \ldots & 0 \\ \ldots & \ldots & \ldots & \ldots \\ h(L-2) & h(L-3) & \ldots & h(0) \end{bmatrix}$$

and defining, at the receiver, the new set of samples y(0), y(1), ..., y(L−2) as $$\begin{bmatrix} y(0) \\ y(1) \\ \vdots \\ y(L-2) \end{bmatrix} = \begin{bmatrix} y(0) \\ y(1) \\ \vdots \\ y(L-2) \end{bmatrix} - U \begin{bmatrix} a(1) \\ a(2) \\ \vdots \\ a(L-1) \end{bmatrix} + \begin{bmatrix} z(0) \\ z(1) \\ \vdots \\ z(L-2) \end{bmatrix} - W \begin{bmatrix} b(0) \\ b(1) \\ \vdots \\ b(L-2) \end{bmatrix}$$

where h(.) is a discretized channel response, a(.) are known or highly reliable values for a non-OFDM period preceding the OFDM symbol, b(.) are known or highly reliable values for a non-OFDM period following the OFDM symbol, z(.) are received values for the non-OFDM period following the OFDM symbol, y(.) on the right hand side of the equation are received samples of the OFDM symbol, and y(.) on the left hand side of the equation are the new set of received samples.

11. A receiver comprising:
processor circuitry adapted to process a signal containing transmission units from a multi-path channel, each transmission unit containing an OFDM symbol and a respective non-OFDM segment for each OFDM symbol, wherein the respective non-OFDM segment enables a conversion from a linear convolution to a cyclic convolution at the receiver for the OFDM symbol;
conversion circuitry the receiver is further adapted to convert received samples of each OFDM symbol to a respective new set of received samples based on the respective non-OFDM segment such that the new set of received samples is mathematically equal to the transmitted samples cyclically convoluted from the linear convolution for each OFDM symbol with the channel response of the multi-path channel.

12. A receiver according to claim 11 further comprising:
finger searches and channel estimation circuitry for performing finger searching and channel estimation based on the non-OFDM segments to generate for each non-OFDM segment a respective time domain channel estimate;
an FFT circuit for performing an FFT function on each time domain channel estimate to generate a respective frequency domain channel estimate;
a time frequency interpolator for performing time frequency interpolation upon multiple frequency domain channel estimates to generate a current frequency domain channel estimate.

13. A receiver according to claim 12 further comprising:
an IFFT circuit for performing an IFFT on the frequency domain channel estimate to get a further time domain channel estimate;
wherein the finger searching and channel estimation circuitry uses the further time domain channel estimate to perform finger searching and channel estimating in the time domain to get an improved time domain channel estimate;
wherein the FFT circuit performs the FFT function again and the time frequency interpolator performs the time frequency interpolation steps again on the improved time domain channel estimate to get an improved current frequency domain channel estimate.

14. A receiving according to claim 12 further comprising:
a demodulator for demodulating contents of the non-OFDM segment using the time domain channel estimate.

15. A receiver according to claim 11, wherein converting received samples of each OFDM symbol to a respective new set of received samples such that the new set of received samples is mathematically equal to the transmitted samples cyclically convoluted with the channel response of the multipath channel comprises:

defining (L−1)×(L−1) upper and lower matrices U and W, respectively, as $$U = \begin{bmatrix} h(L-1) & h(L-2) & \ldots & h(1) \\ 0 & h(L-1) & \ldots & h(2) \\ \ldots & \ldots & \ldots & \ldots \\ 0 & 0 & \ldots & h(L-1) \end{bmatrix},$$

$$W = \begin{bmatrix} h(0) & 0 & \ldots & 0 \\ h(1) & h(0) & \ldots & 0 \\ \ldots & \ldots & \ldots & \ldots \\ h(L-2) & h(L-3) & \ldots & h(0) \end{bmatrix}$$

and defining the new set of samples y(0), y(1), ..., y(L−2) as $$\begin{bmatrix} y(0) \\ y(1) \\ \vdots \\ y(L-2) \end{bmatrix} = \begin{bmatrix} y(0) \\ y(1) \\ \vdots \\ y(L-2) \end{bmatrix} - U \begin{bmatrix} a(1) \\ a(2) \\ \vdots \\ a(L-1) \end{bmatrix} + \begin{bmatrix} z(0) \\ z(1) \\ \vdots \\ z(L-2) \end{bmatrix} - W \begin{bmatrix} b(0) \\ b(1) \\ \vdots \\ b(L-2) \end{bmatrix}$$

where h(.) is a discretized channel response, a(.) are known or highly reliable values for a non-OFDM period preceding the OFDM symbol, b(.) are known or highly reliable values for a non-OFDM period following the OFDM symbol, z(.) are received values for the non-OFDM period following the OFDM symbol, y(.) on the right hand side of the equation are received samples of the OFDM symbol, and y(.) on the left hand side of the equation are the new set of received samples.

* * * * *